United States Patent
Tsumori et al.

(10) Patent No.: US 8,521,394 B2
(45) Date of Patent: Aug. 27, 2013

(54) VEHICLE RUNNING CONTROL APPARATUS AND VEHICLE RUNNING CONTROL METHOD

(75) Inventors: Chika Tsumori, Susono (JP); Osamu Komeda, Mishima (JP); Mitsuhiro Tabata, Sunto-gun (JP); Yukari Okamura, Gotenba (JP); Hiroshi Tsujii, Mishima (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 903 days.

(21) Appl. No.: 12/668,279

(22) PCT Filed: Feb. 9, 2009

(86) PCT No.: PCT/JP2009/052170
§ 371 (c)(1),
(2), (4) Date: Jan. 8, 2010

(87) PCT Pub. No.: WO2009/101920
PCT Pub. Date: Aug. 20, 2009

(65) Prior Publication Data
US 2010/0324795 A1    Dec. 23, 2010

(30) Foreign Application Priority Data
Feb. 12, 2008    (JP) ................. 2008-030150

(51) Int. Cl.
*B60T 8/32* (2006.01)
(52) U.S. Cl.
USPC .................. 701/96; 701/123; 701/110
(58) Field of Classification Search
USPC .............. 701/1, 70, 93–96, 103–105, 123, 701/79, 98, 110; 303/177, 184, 185
See application file for complete search history.

(56) References Cited

U.S. PATENT DOCUMENTS

| | | | | |
|---|---|---|---|---|
| 5,752,214 A | * | 5/1998 | Minowa et al. | 701/111 |
| 5,902,345 A | * | 5/1999 | Minowa et al. | 701/96 |
| 6,216,082 B1 | * | 4/2001 | Minowa et al. | 701/96 |
| 6,330,506 B1 | * | 12/2001 | Roulet | 701/93 |
| 6,397,140 B2 | * | 5/2002 | Minowa et al. | 701/96 |
| 7,016,803 B2 | * | 3/2006 | Kitazawa | 702/142 |
| 7,699,129 B2 | * | 4/2010 | Treharne et al. | 180/65.265 |
| 7,715,971 B2 | * | 5/2010 | Okuda et al. | 701/93 |
| 7,957,884 B2 | * | 6/2011 | Wakashiro et al. | 701/93 |
| 8,037,870 B2 | * | 10/2011 | Saito et al. | 123/492 |

(Continued)

FOREIGN PATENT DOCUMENTS

| | | |
|---|---|---|
| JP | 56 22113 | 3/1981 |
| JP | 62 61832 | 3/1987 |

(Continued)

*Primary Examiner* — Thomas Black
*Assistant Examiner* — Ce Li
(74) *Attorney, Agent, or Firm* — Oblon, Spivak, McClelland, Maier & Neustadt, L.L.P.

(57) ABSTRACT

A main ECU (71) for generating an actual acceleration/deceleration running pattern based on a current running situation of a vehicle, generating a corrected acceleration/deceleration running pattern obtained by elongating an actual acceleration/deceleration period of the actual acceleration/deceleration running pattern when an actual acceleration/deceleration period (T1) in the actual acceleration/deceleration running pattern is shorter than a reference acceleration/deceleration period (T0) set in advance, and setting the actual acceleration/deceleration running pattern as a best acceleration/deceleration running pattern when the corrected acceleration/deceleration running pattern is not generated and setting the corrected acceleration/deceleration running pattern as the best acceleration/deceleration running pattern when the corrected acceleration/deceleration running pattern is generated, is provided.

28 Claims, 9 Drawing Sheets

(56) References Cited

U.S. PATENT DOCUMENTS

| 8,249,767 B2* | 8/2012 | Watanabe et al. | 701/22 |
| 8,340,884 B1* | 12/2012 | He et al. | 701/103 |
| 2002/0133288 A1* | 9/2002 | Minami et al. | 701/114 |
| 2003/0171186 A1* | 9/2003 | Okada et al. | 477/71 |
| 2004/0128057 A1* | 7/2004 | Kitazawa et al. | 701/110 |
| 2005/0075826 A1* | 4/2005 | Kitazawa | 702/141 |
| 2009/0288636 A1* | 11/2009 | Saito et al. | 123/399 |

FOREIGN PATENT DOCUMENTS

| JP | 63 121528 | 5/1988 |
| JP | 2007 187090 | 7/2007 |
| JP | 2007 291919 | 11/2007 |

\* cited by examiner

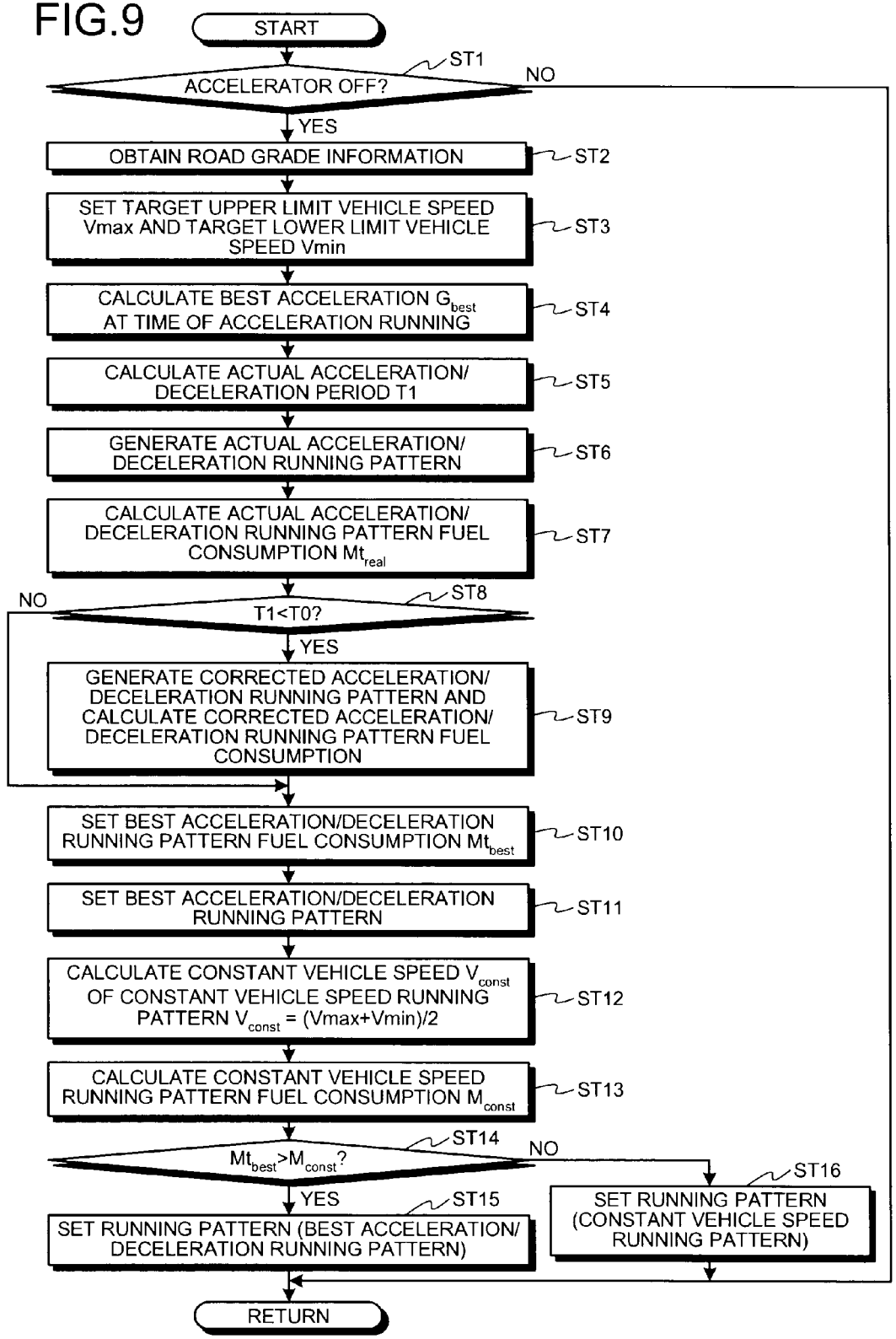

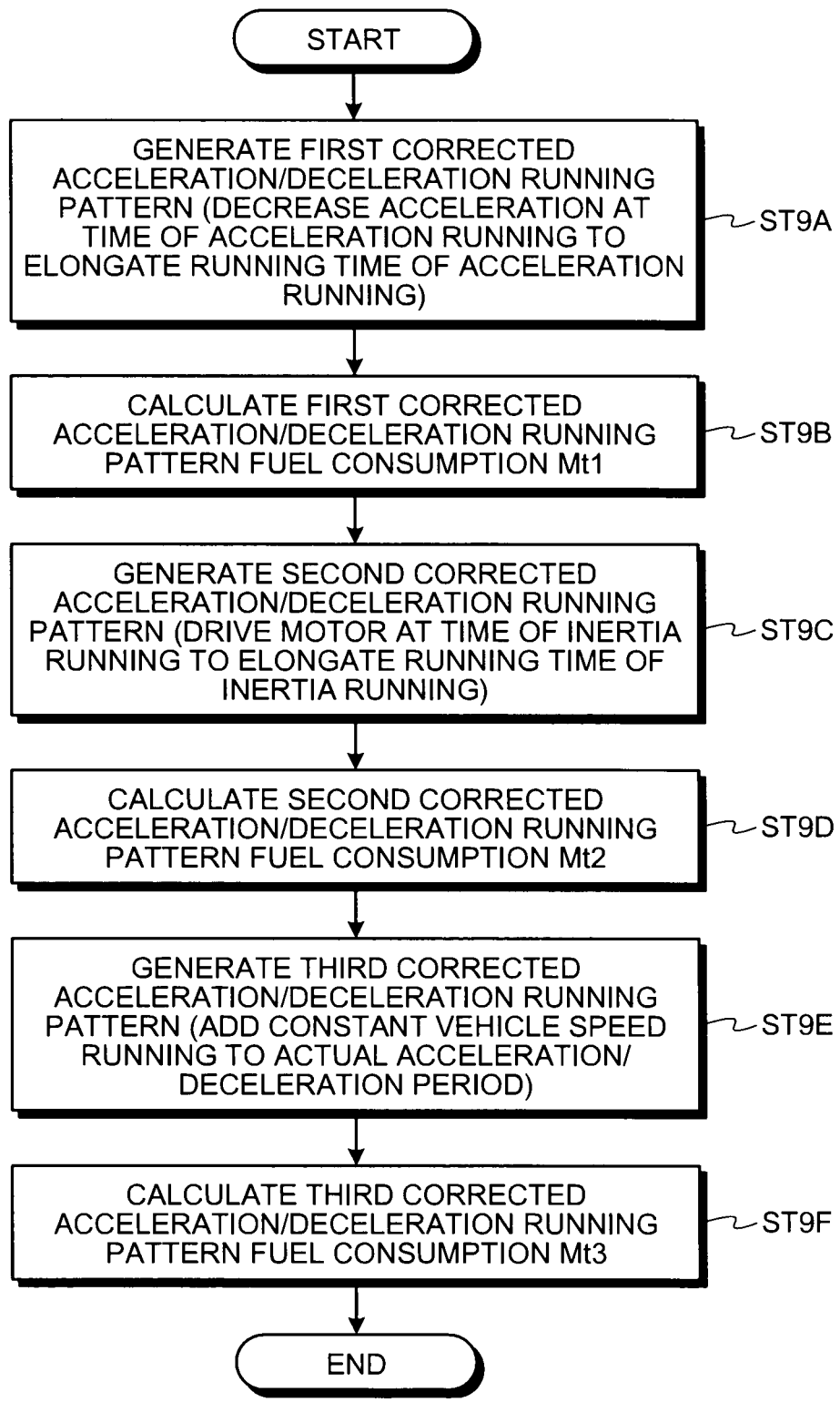

VEHICLE RUNNING CONTROL APPARATUS AND VEHICLE RUNNING CONTROL METHOD

TECHNICAL FIELD

The present invention relates to a vehicle running control apparatus and a vehicle running control method capable of carrying out an acceleration/deceleration running pattern, which performs acceleration running for accelerating until reaching a target upper limit vehicle speed by utilizing drive force of a thermal engine after reaching a target lower limit vehicle speed, and inertia running for blocking transmission of the drive force of the thermal engine to drive wheels after reaching the target upper limit vehicle speed, thereby allowing a vehicle to run through inertia until reaching the target lower limit vehicle speed, after accelerator off.

BACKGROUND ART

The vehicle running control apparatus and the vehicle running control method for carrying out this type of acceleration/deceleration running pattern is conventionally known, and in the vehicle running control apparatus and the vehicle running control method, fuel consumption is improved by allowing the vehicle to run with the acceleration/deceleration running pattern. For example, the vehicle running control apparatus is disclosed in following patent documents 1 and 2. First, the patent document 1 discloses the technique to observe inter-vehicular distance from the vehicle in front, and allow the vehicle to perform the inertia running when the inter-vehicular distance is shorter than a minimum inter-vehicular distance corresponding to a vehicle speed and allow the vehicle to perform the acceleration running when the inter-vehicular distance is longer than a maximum inter-vehicular distance corresponding to the vehicle speed. In addition, the Patent Document 2 discloses the technique to perform the acceleration running by the drive force of the internal-combustion engine until reaching the upper limit speed, stop the internal-combustion engine after reaching the upper limit vehicle speed, thereby performing the inertia running until reaching the lower limit vehicle speed, and restart the internal-combustion engine after reaching the lower limit vehicle speed, thereby performing the acceleration running by the drive force of the internal-combustion engine.

Patent Document 1: Japanese Patent Application Laid-open No. 2007-291919
Patent Document 2: Japanese Patent Application Laid-open No. 2007-187090

DISCLOSURE OF INVENTION

Problem to be Solved by the Invention

Herein, in the vehicle running control apparatus of the above-described Patent Document 1, start timing of the acceleration running and the inertia running is determined according to the inter-vehicular distance from the vehicle in front, so that switch timing to the acceleration running and the inertia running varies depending on motion of the vehicle in front (that is to say, change in the vehicle speed). For that reason, in the vehicle running control apparatus, the acceleration running and the inertia running are frequently switched to increase change in acceleration and deceleration of the vehicle, and it is possible to bring uncomfortable feeling to a driver. Also, it is possible that running time of the acceleration running is extremely long relative to the running time of the inertia running, and in this case, a large amount of fuel is consumed and an effect to improve the fuel consumption might be poor.

Also, in the vehicle running control apparatus of the above-described Patent Document 2, although the upper limit speed and the lower limit speed are set to speeds having optimal fuel consumption, if one period including the inertia running and the acceleration running is too short, the inertia running and the acceleration running are frequently switched and it is possible to bring the above-described uncomfortable feeling to the driver.

Then, an object of the present invention is to improve disadvantage of the conventional technique, thereby providing the vehicle running control apparatus and the vehicle running control method in which both improvement of the fuel consumption in the running pattern after the accelerator off and resolution of the uncomfortable feeling for the driver associated with the change in the vehicle speed and acceleration and deceleration of the vehicle can be satisfied.

Means for Solving Problem

In order to solve the above problems, in the present invention, a vehicle running control apparatus for carrying out an acceleration/deceleration running pattern alternately repeating acceleration running for accelerating a vehicle running with at least a thermal engine as a drive source until reaching a target upper limit vehicle speed by utilizing drive force of the drive source after reaching a target lower limit vehicle speed, and inertia running for blocking transmission of the drive force of the thermal engine to drive wheels after reaching the target upper limit vehicle speed and allowing the vehicle to run through inertia until reaching the target lower limit vehicle speed, the apparatus includes generating an actual acceleration/deceleration running pattern including running states of the inertia running and the acceleration running based on a current running situation of the vehicle; generating a corrected acceleration/deceleration running pattern obtained by elongating an actual acceleration/deceleration running pattern, when the actual acceleration/deceleration period from start of the inertia running to end of the acceleration running in the actual acceleration/deceleration running pattern is shorter than a reference acceleration/deceleration period set in advance; and setting the actual acceleration/deceleration running pattern as a best acceleration/deceleration running pattern when the corrected acceleration/deceleration running pattern is not generated, and setting the corrected acceleration/deceleration running pattern as the best acceleration/deceleration running pattern when the corrected acceleration/deceleration running pattern is generated.

Further, in order to solve the above problems, in the present invention, a vehicle running control method for carrying out an acceleration/deceleration running pattern alternately repeating acceleration running for accelerating a vehicle running with at least a thermal engine as a drive source until reaching a target upper limit vehicle speed by utilizing drive force of the drive source after reaching a target lower limit vehicle speed, and inertia running for blocking transmission of the drive force of the thermal engine to drive wheels after reaching the target upper limit vehicle speed and allowing the vehicle to run through inertia until reaching the target lower limit vehicle speed, the method includes an actual acceleration/deceleration running pattern generating step of generating an actual acceleration/deceleration running pattern including running states of the inertia running and the acceleration running based on a current running situation of the vehicle; a corrected acceleration/deceleration running pattern generating means of generating a corrected acceleration/deceleration running pattern obtained by elongating an actual acceleration/deceleration period of the actual acceleration/deceleration running pattern, when the actual acceleration/deceleration period from start of the inertia running to end of the acceleration running in the actual acceleration/deceleration running pattern is shorter than a reference acceleration/deceleration period set in advance; and a best acceleration/deceleration running pattern setting step of setting the actual acceleration/deceleration running pattern as a best acceleration/deceleration running pattern when the corrected acceleration/deceleration running pattern is not generated, and setting the corrected acceleration/deceleration running pattern as the best acceleration/deceleration running pattern when the corrected acceleration/deceleration running pattern is generated.

Here, acceleration at the time of the acceleration running in the actual acceleration/deceleration running pattern can be corrected to be small as a preferable embodiment, when generating the corrected acceleration/deceleration running pattern obtained by elongating the actual acceleration/deceleration period.

Further, when acceleration at the time of the acceleration running is corrected to be small as above, and when the acceleration is corrected, a target charge amount of a storage battery for storing electric power generated by utilizing a part of the power of the thermal engine can be reset to a large value corresponding to the acceleration after correction.

Further, when the vehicle is provided with a motor in addition to the thermal engine as the drive source, deceleration at the time of the inertia running in the actual acceleration/deceleration running pattern is preferably corrected to be small by adding drive force of the motor when generating the corrected acceleration/deceleration running pattern obtained by elongating the actual acceleration/deceleration period.

Further, when generating the corrected acceleration/deceleration running pattern obtained by elongating the actual acceleration/deceleration period, constant vehicle speed running at the target lower limit vehicle speed is added when shifting from the inertia running to the acceleration running of the actual acceleration/deceleration running pattern, and/or constant vehicle speed running at the target upper limit vehicle speed can be added when shifting from the acceleration running to the inertia running of the actual acceleration/deceleration running pattern.

The constant vehicle speed running at the target upper limit vehicle speed can be carried out by activating the thermal engine, and the constant vehicle speed running at the target lower limit vehicle speed can be carried out by activating a motor if the vehicle is provided with the motor.

Further, when generating the actual acceleration/deceleration running pattern, best acceleration at the time of the acceleration running of the actual acceleration/deceleration running pattern excellent in thermal efficiency of the thermal engine can be obtained based on a road grade of a road on which the vehicle is running and a vehicle speed, which are running situations of the vehicle.

Further, the target upper limit vehicle speed can be set according to requirement of a driver.

Further, when setting the target upper limit vehicle speed, a vehicle speed at the time of accelerator off associated with accelerator pedal operation by a driver can be set as the target upper limit vehicle speed.

Further, the target lower limit vehicle speed can be set based on the target upper limit vehicle speed and a road grade of a road on which the vehicle is running, which are running situations of the vehicle.

Further, the target lower limit vehicle speed can be set such that difference in vehicle speed between the target lower limit vehicle speed and the target upper vehicle speed gets smaller with increasing target upper limit vehicle speed, when a road grade of a road on which the vehicle is running is up-grade.

Further, the target lower limit vehicle speed can be set such that difference in vehicle speed between the target lower limit vehicle speed and the target upper vehicle speed gets larger with increasing target upper limit vehicle speed, when a road grade of a road on which the vehicle is running is down-grade.

Further, the reference acceleration/deceleration period can be a value, which can be changed by a driver according to preference, or a value set in advance such that improvement of fuel consumption and resolution of uncomfortable feeling of the driver associated with change in vehicle speed and acceleration and deceleration of the vehicle can go together.

Further, the inertia running can be carried out by blocking the transmission of the drive force of the thermal engine to the drive wheels and by stopping the thermal engine, or carried out only by blocking the transmission of the drive force of the thermal engine to the drive wheels without stopping the thermal engine when an amount of fuel consumed in an idling state of the thermal engine is small.

EFFECT OF THE INVENTION

The vehicle running control apparatus and the vehicle running control method according to the present invention compares the actual acceleration/deceleration period to the reference acceleration/deceleration period, and judges that the running with the actual acceleration/deceleration running pattern causes large change in acceleration and deceleration of the vehicle (frequent switching between the inertia running and the acceleration running) when the actual acceleration/deceleration period is shorter than the reference acceleration/deceleration period. For that reason, the vehicle running control apparatus and the vehicle running control method in this case performs the running with the corrected acceleration/deceleration running pattern, which inhibits the large change in the acceleration and deceleration of the vehicle by elongating the actual acceleration/deceleration period of the actual acceleration/deceleration running pattern. By doing so, the vehicle running control apparatus and the vehicle running control method can achieve a good balance between the improvement of the fuel consumption and the resolution of the uncomfortable feeling of the driver. On the other hand, the vehicle running control apparatus and the vehicle running control method judges that it is possible to achieve a good balance between the improvement of the fuel consumption and the resolution of the uncomfortable feeling of the driver by the running with the actual acceleration/deceleration running pattern when the actual acceleration/deceleration period is not shorter than the reference acceleration/deceleration period and performs the running with the actual acceleration/deceleration running pattern. In this manner, the vehicle running control apparatus and the vehicle running control method according to the present invention is capable of not only improving the fuel consumption but also solving the uncomfortable feeling of the driver associated with the change in the vehicle speed and acceleration and deceleration of the vehicle.

BRIEF DESCRIPTION OF DRAWINGS

FIG. 9 is a flowchart showing setting operation of a running pattern of the vehicle running control apparatus and the vehicle running control method according to the present invention.

FIG. 10 is a flowchart showing generating operation of the corrected acceleration/deceleration running pattern and calculation operation of corrected acceleration/deceleration running pattern fuel consumption of the vehicle running control apparatus and the vehicle running control method according to the present invention.

Figure 1:
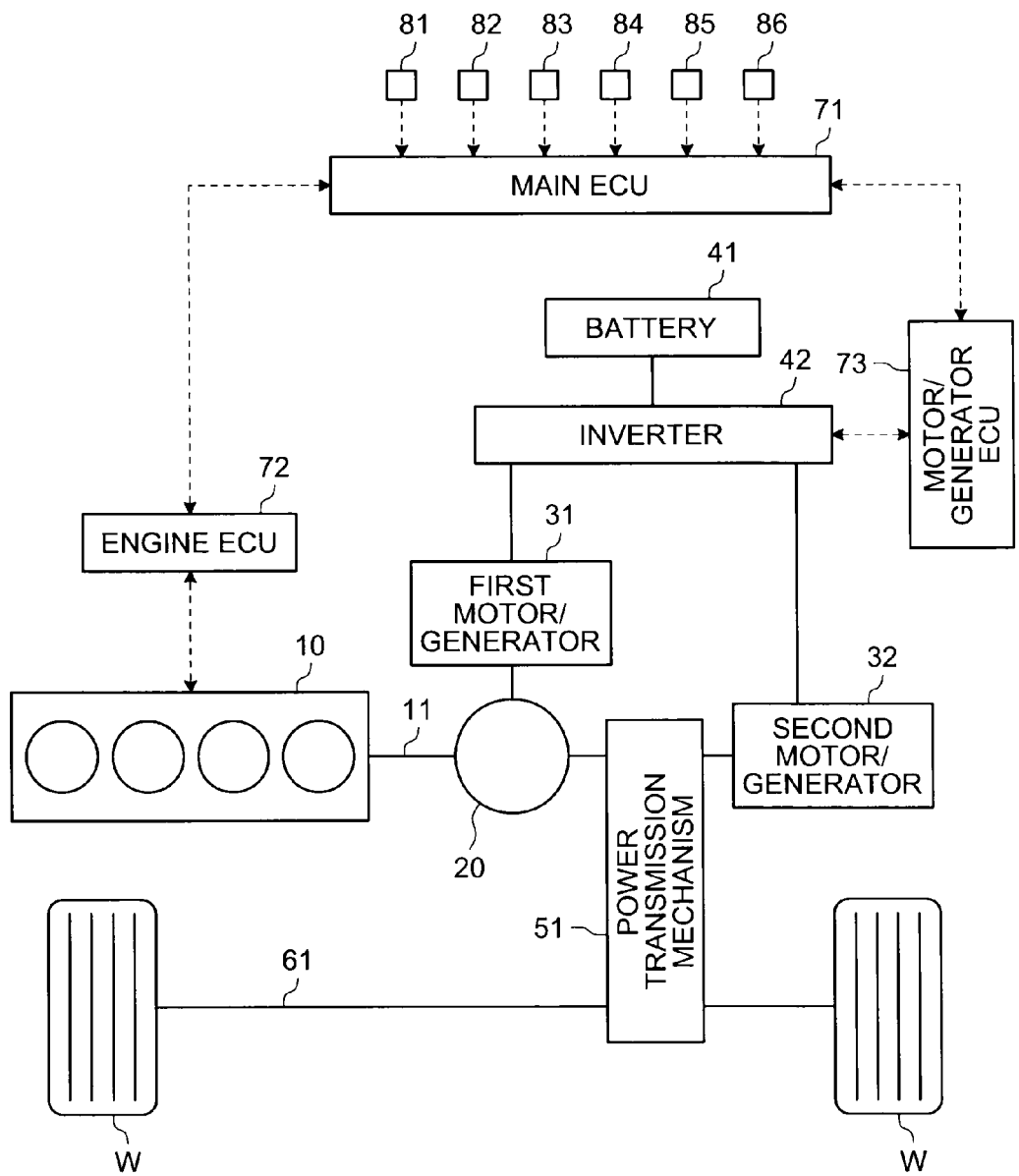
FIG. 1 is a diagram illustrating one example of a vehicle running control apparatus and a vehicle running control method according to the present invention and a vehicle to which the apparatus and the method are applied.

EXPLANATIONS OF LETTERS OR NUMERALS 10 internal-combustion engine (thermal engine)
11 crankshaft
20 power dividing mechanism
31 first motor/generator
32 second motor/generator
41 battery (storage battery)
42 inverter
51 power transmission mechanism
61 drive shaft
84 accelerator opening sensor
71 main ECU
72 engine ECU
73 motor/generator ECU
T0 reference acceleration/deceleration period
T1 actual acceleration/deceleration period
Vmax target upper limit vehicle speed
Vmin target lower limit vehicle speed

BEST MODE(S) FOR CARRYING OUT THE INVENTION

Hereinafter, an embodiment of a vehicle running control apparatus and a vehicle running control method according to the present invention is described in detail with reference to drawings. Meanwhile, the present invention is not limited by the embodiment.

Embodiment

The embodiment of the vehicle running control apparatus and the vehicle running control method according to the present invention is described with reference to FIGS. 1 to 10.

The vehicle running control apparatus of the present embodiment, which is the control apparatus applied to a vehicle running at least with a thermal engine as a drive source, is capable of carrying out a running pattern (hereinafter, referred to as an "acceleration/deceleration running pattern"), which alternately repeats acceleration running for accelerating the vehicle until reaching a target upper limit vehicle speed Vmax by utilizing drive force of the drive source after reaching a target lower limit vehicle speed Vmin and inertia running for blocking transmission of the drive force of the thermal engine to drive wheels and stopping the thermal engine, thereby allowing the vehicle to run through inertia until reaching the target lower limit vehicle speed Vmin after reaching the target upper limit vehicle speed Vmax, in order to improve fuel consumption (running distance per unit fuel amount) of the thermal engine. That is to say, the vehicle running control apparatus inhibits fuel consumption of the thermal engine during the inertia running by carrying out the acceleration/deceleration running pattern, thereby improving the fuel consumption.

Therefore, it is required that the vehicle to which the vehicle running control apparatus is applied is capable of breaking connection between an output shaft of the thermal engine and the drive wheels during the running and of stopping operation of the thermal engine (that is to say, stopping supply of fuel). For example, in the present embodiment, a following so-called hybrid vehicle (herein, a series-parallel hybrid type hybrid vehicle) capable of simultaneously or separately using the thermal engine and a motor as the drive sources and of breaking the connection between the output shaft of the thermal engine an the drive wheels during the running to stop the thermal engine is illustrated.

In the hybrid vehicle, as shown in FIG. 1, an internal-combustion engine 10 as the thermal engine, a power dividing mechanism 20 for dividing the drive force output from the internal-combustion engine 10 (hereinafter, referred to as "engine power"), a first motor/generator 31 for operating as a generator by the engine power divided by the power dividing mechanism 20 (hereinafter, referred to as "divided power"), and a second motor/generator 32 operating as the motor by using electric power generated by the first motor/generator 31 and/or electric power of a battery 41 are provided.

Herein, although not shown, the power dividing mechanism 20 is composed of a planetary gear mechanism having a planetary carrier of which rotational shaft is coupled to a crankshaft 11 of the internal-combustion engine 10, a pinion gear pivotably supported by the planetary carrier, a sun gear of which rotational shaft is coupled to the first motor/generator 31, and a ring gear of which rotational shaft is coupled to the second motor/generator 32, for example. A drive shaft 61 of driving wheels W, W is coupled to the ring gear through a power transmission mechanism 51 composed of a decelerator or the like. For that reason, the engine power of the internal-combustion engine 10 is transmitted to the sun gear and the ring gear through the pinion gear. Then, the divided power, which passes through the sun gear, activates the first motor/generator 31 as the generator, and the divided power, which passes through the ring gear, directly drives the drive shaft 61 through the power transmission mechanism 51.

In addition, the hybrid vehicle is provided with controlling means for controlling various operations. In the present embodiment, an electronic control unit for controlling operation of an entire hybrid vehicle (hereinafter, referred to as a "main ECU") 71, an electronic control unit for controlling operation of the internal-combustion engine 10 (hereinafter, referred to as an "engine ECU") 72, and an electronic control unit for controlling operation of the first motor/generator 31 and the second motor/generator 32 (hereinafter, referred to as a "motor/generator ECU") 73 are provided as the controlling means. In the present embodiment, the main ECU 71, the engine ECU 72 and the motor/generator ECU 73 function as the vehicle running control apparatus according to the present invention. The main ECU 71, the engine ECU 72 and the motor/generator ECU 73 are composed of a central processing unit (CPU) not shown, a read only memory (ROM) for storing a predetermined control program or the like in advance, a random access memory (RAM) for temporarily storing a calculation result of the CPU, a backup RAM for storing information such as map data prepared in advance, and the like.

Further, various sensors such as a crank angle sensor 81 for detecting a crank angle of the crankshaft 11 of the internal-combustion engine 10, a throttle opening sensor 82 for detecting throttle opening of a throttle valve (not shown) of the internal-combustion engine 10, an A/F sensor 83 for detecting an air-fuel ratio, and an accelerator opening sensor 84 for detecting accelerator opening are provided in the hybrid vehicle.

Output signals of the sensors 81 to 84 are input to the main ECU 71, and drive force controlling means of the main ECU 71 obtains a required value of the drive force (hereinafter, referred to as "required drive force") to be exerted on the drive shaft 61 based on the input signals, the map data of the backup RAM and the like. Then, the drive force controlling means sets power of the internal-combustion engine 10 and of the second motor/generator 32 and distribution thereof for generating the required drive force on the drive shaft 61, and transmits setting condition thereof to the engine ECU 72 and the motor/generator ECU 73.

When generating the required drive force on the drive shaft 61 only by engine power of the internal-combustion engine 10, the drive force controlling means of the main ECU 71 obtains a required value of the engine power (hereinafter, referred to as "required engine power") to transmit to the engine ECU 72, and transmits a command to the motor/generator ECU 73 so as not to activate the second motor/generator 32 as the motor. The required engine power is the engine power of the internal-combustion engine 10 required for generating the required drive force on the drive shaft 61, and is the value obtained in view of a power distribution ratio of the power dividing mechanism 20 and a gear ratio of the power transmission mechanism 51.

The engine ECU 72, which receives the command, controls ignition timing or the like of the internal-combustion engine 10 so as to output the required engine power. Therefore, in the hybrid vehicle at that time, the required engine power output from the internal-combustion engine 10 is divided by the power dividing mechanism 20, and one part of the divided power is transmitted to the drive shaft 61 through the power transmission mechanism 51. At that time, since the second motor/generator 32 does not operate as the motor, the drive shaft 61 is driven by the required drive force only by the engine power of the internal-combustion engine 10. At that time, the other part of the divided power is transmitted to the first motor/generator 31 to activate the first motor/generator 31 as the generator. When a storage amount is small and a charge amount of a battery (storage battery) 41 does not reach a target charge amount, the motor/generator ECU 73 charges the battery 41 with generated electric power through an inverter 42. Herein, the target charge amount is set by target charge amount setting means of the main ECU 71 according to the storage amount of the battery 41, the engine power of the internal-combustion engine 10 and the like.

Also, when generating the required drive force on the drive shaft 61 only by the drive force of the second motor/generator 32 activated as the motor (hereinafter, referred to as "motor power"), the drive force controlling means of the main ECU 71 transmits a control condition value of fuel cut or stop of the internal-combustion engine 10 to the engine ECU 72, and obtains a required value of the motor power (hereinafter, referred to as "required motor power"), which the second motor/generator 32 is allowed to output, to transmit to the motor/generator ECU 73. The required motor power is the motor power of the second motor/generator 32 required for generating the required drive force on the drive shaft 61, and is the value obtained in view of the gear ratio of the power transmission mechanism 51.

The motor/generator ECU 73, which receives the command, obtains supplied electric power to the second motor/generator 32, which realizes the required motor power, and allows the battery 41 to supply the supplied electric power to the second motor/generator 32 through the inverter 42. Therefore, in the hybrid vehicle at that time, the output required motor power is transmitted to the drive shaft 61 through the power transmission mechanism 51. At that time, since the internal-combustion engine 10 does not output the engine power, the drive shaft 61 is driven by the required drive force only by the motor power of the second motor/generator 32. Herein, in this case, the second motor/generator 32 operates by the electric power of the battery 41, so that the storage amount of the battery 41 decreases. For example, the time of startup and low-speed running correspond to the case of operating only by the motor power.

Also, when generating the required drive force on the drive shaft 61 by the engine power of the internal-combustion engine 10 and the motor power of the second motor/generator 32, the drive force controlling means of the main ECU 71 obtains the required engine power and the required motor power based on the required drive force, the power distribution ratio of the power dividing mechanism 20 and the gear ratio of the power transmission mechanism 51 to transmit to the engine ECU 72 and the motor/generator ECU 73, respectively.

Upon reception of the command, the engine ECU 72 controls the engine power of the internal-combustion engine 10 according to the required engine power, and the motor/generator ECU 73 controls the inverter 42 according to the required motor power. Therefore, in the hybrid vehicle at that time, the one part of the divided power of the required engine power and the required motor power are transmitted to the drive shaft 61 through the power transmission mechanism 51 to generate the required drive force. At that time, the other part of the divided power of the required engine power is transmitted to the first motor/generator 31 to activate the first motor/generator 31 as the generator. Herein, it is configured that the second motor/generator 32 is supplied with the electric power generated by the first motor/generator 31 through the inverter 42, and the second motor/generator 32 is driven as the motor by the electric power. That is to say, in the hybrid vehicle in this case, the drive shaft 61 is directly driven by the divided power of the required engine power, and further, the drive force of the drive shaft 61 is supported by the second motor/generator 32 driven as the motor by using the generated electric power by the other part of the divided power. For example, the time of high-load operation such as full throttle acceleration corresponds to a case of operating by the engine power and the motor power. Meanwhile, the generated electric power of the first motor/generator 31 is stored in the battery 41 except that is utilized as the power of the second motor/generator 32.

Further, in the hybrid vehicle, there is a case in which the internal-combustion engine 10 is stopped and the operation of the second motor/generator 32 as the motor is stopped at the time of braking operation. Meanwhile, at that time, the second motor/generator 32 operates as the generator and the generated electric power is stored in the battery 41.

Herein, the operation of the internal-combustion engine 10 and the second motor/generator 32 at the time of the braking operation may be realized even during the running in which the brake operation is not performed (that is to say, a brake pedal not shown is not depressed). Then, the hybrid vehicle stops the internal-combustion engine 10 and stops the operation of the second motor/generator 32 as the motor during the running, thereby running through inertia while decelerating from a vehicle speed at the time of stop. Also, the hybrid vehicle can restart the internal-combustion engine 10 or activate the second motor/generator 32 as the motor from a state of the inertia running to shift to the acceleration running. Therefore, the hybrid vehicle is capable of realizing the above-described acceleration/deceleration running pattern.

Next, a specific example of the running with the acceleration/deceleration running pattern by the vehicle running control apparatus of the present embodiment is described. The vehicle running control apparatus of the present embodiment generates the acceleration/deceleration running pattern (hereinafter, referred to as an "actual acceleration/deceleration running pattern"), which improves the fuel consumption, based on a current actual running situation of the vehicle (such as the vehicle speed and a road grade of a road on which the vehicle is running) at the time of accelerator off. Then, the vehicle running control apparatus allows the vehicle to run with the actual acceleration/deceleration running pattern, on the other hand, when it is possible to bring uncomfortable feeling associated with large change in the vehicle speed and acceleration and deceleration of the vehicle to a driver with the actual acceleration/deceleration running pattern, this generates the acceleration/deceleration running pattern obtained by altering the actual acceleration/deceleration running pattern (hereinafter, referred to as a "corrected acceleration/deceleration running pattern") in order to solve the uncomfortable feeling and allows the vehicle to run with the corrected acceleration/deceleration running pattern. In addition, when a running pattern at a constant speed (hereinafter, referred to as a "constant vehicle speed running pattern"), which is excellent from the viewpoint of resolution of the uncomfortable feeling of the driver, is more excellent in the fuel consumption than the acceleration/deceleration running pattern, the vehicle running control apparatus allows the vehicle to run with the constant vehicle speed running pattern.

Figure 2:
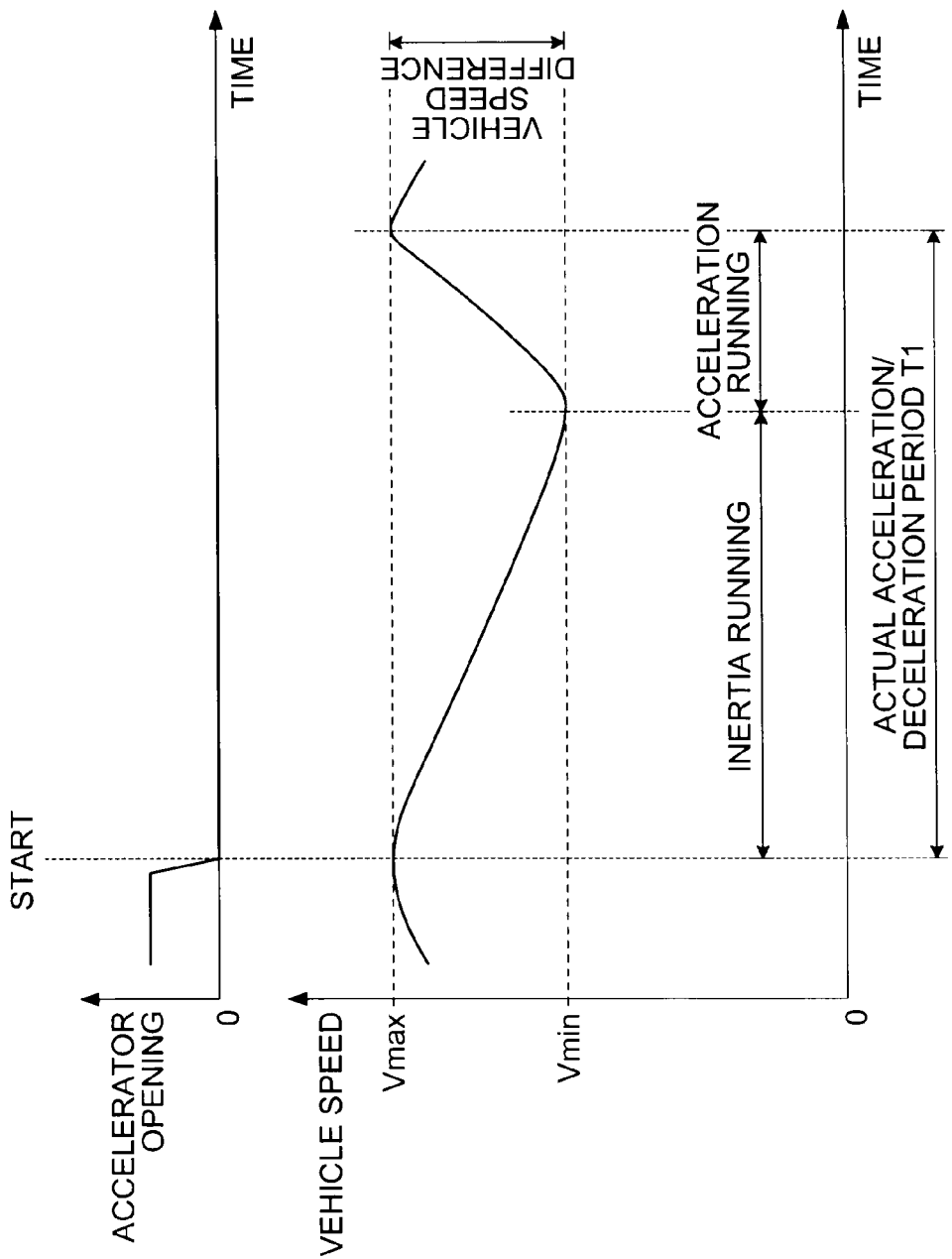
FIG. 2 is a diagram illustrating one example of an actual acceleration/deceleration running pattern.

Takeoff of a foot of the driver from the accelerator pedal not shown (that is to say, accelerator off requirement associated with accelerator pedal operation, which is requirement of the driver) triggers a shift of the vehicle running control apparatus to the running with the acceleration/deceleration running pattern or the constant vehicle speed running pattern. For example, the main ECU 71 starts the running with the acceleration/deceleration running pattern at a point in time when the accelerator opening detected by the accelerator opening sensor 84 becomes "0", as shown in FIG. 2.

[Actual Acceleration/Deceleration Running Pattern]

The acceleration/deceleration running pattern is the running pattern, which alternately repeats the acceleration running and the inertia running between the target upper limit vehicle speed Vmax and the target lower limit vehicle speed Vmin, as described above. For that reason, when performing the running with the acceleration/deceleration running pattern (hereinafter, referred to as "acceleration/deceleration running"), the main ECU 71 is allowed to carry out setting of the target upper limit vehicle speed Vmax and the target lower limit vehicle speed Vmin. The main ECU 71 of the present embodiment sets the target upper limit vehicle speed Vmax and the target lower limit vehicle speed Vmin based on the current actual running situation of the vehicle at the time of the accelerator off. In other words, the target upper limit vehicle speed Vmax and the target lower limit vehicle speed Vmin are the target vehicle speeds on an upper limit side and on a lower limit side in the actual acceleration/deceleration running pattern. Therefore, in the present embodiment, actual acceleration/deceleration running pattern generating means of the main ECU 71 is allowed to set the target upper limit vehicle speed Vmax and the target lower limit vehicle speed Vmin.

First, as for the target upper limit vehicle speed Vmax, the vehicle speed at the time when the accelerator off is detected is directly set. This is because, when the vehicle speed increases despite the takeoff of the foot of the driver from the accelerator pedal, the driver feels uncomfortable. Information of the vehicle speed is detected by a vehicle speed sensor 85 shown in FIG. 1.

Also, the target lower limit vehicle speed Vmin is set based on difference between the target upper limit vehicle speed Vmax and the target lower limit vehicle speed Vmin (hereinafter, referred to as "vehicle speed difference"). The vehicle speed difference is a value set based on the current actual running situation of the vehicle at the time of the accelerator off so as not to bring the uncomfortable feeling to the driver as described above. For that reason, the target lower limit vehicle speed Vmin is a value obtained by subtracting the vehicle speed difference from the target upper limit vehicle speed Vmax. Therefore, the actual acceleration/deceleration running pattern generating means of the main ECU 71 of the present embodiment is allowed to first obtain the vehicle speed difference when setting the target lower limit vehicle speed Vmin.

Herein, since the acceleration/deceleration running pattern repeats the acceleration running and the inertia running with deceleration with a certain period (hereinafter, referred to as an "acceleration/deceleration period"), when the acceleration/deceleration period is too short, the acceleration running and the inertia running are frequently switched to each other (in other words, the change in the acceleration and deceleration of the vehicle is rapid) and the driver feels uncomfortable. For example, when the vehicle speed difference is decreased, the running time of the inertia running becomes short and the acceleration/deceleration period also becomes short. However, when the vehicle speed difference is unnecessarily increased, although it is possible to elongate the acceleration/deceleration period by elongation of the running time of the inertia running, the driver feels uncomfortable by the large change in the vehicle speed. That is to say, the vehicle speed difference is one element to determine the acceleration/deceleration period.

Then, in the present embodiment, the vehicle speed difference, which does not bring the uncomfortable feeling to the driver, is set in advance by an experiment and a simulation. Herein, for example, map data shown in FIG. 3 obtained by the experiment or the like is prepared.

Figure 3:
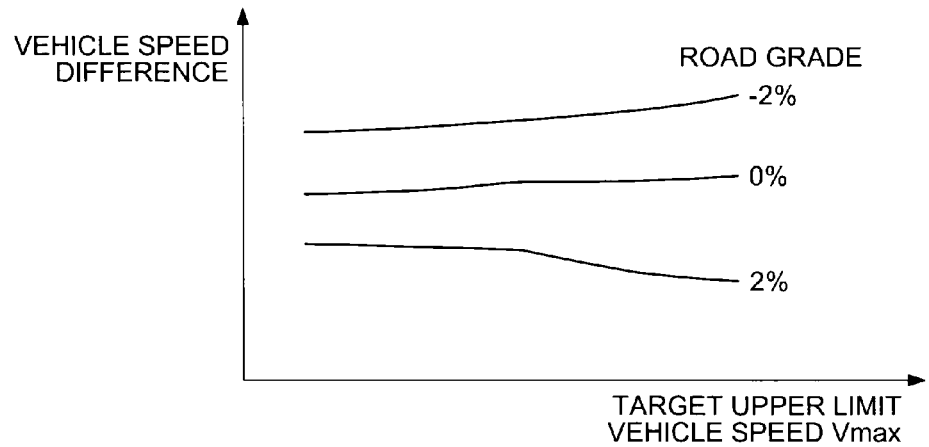
FIG. 3 is a diagram illustrating one example of map data for obtaining difference in vehicle speed.

For example, the deceleration of the vehicle during the inertia running is larger on a flat road than on a down-grade road, and is larger on an up-grade road than on the flat road. For that reason, on the up-grade road, difference between the deceleration and the acceleration when switching from the inertia running to the acceleration running is large, so that it is desired to decrease the vehicle speed difference so as not to bring the uncomfortable feeling by the change in the acceleration and deceleration to the driver. Therefore, the vehicle speed difference of the present embodiment is set to be smaller on the flat road (road grade of 0%) than on the down-grade road (for example, the road grade of −2%), and smaller on the up-grade road (for example, the road grade of 2%) than on the flat road, as shown in FIG. 3. Also, in the present embodiment, as shown in FIG. 3, in a case of the up-grade road, the vehicle speed difference is decreased with increasing target upper limit vehicle speed Vmax, which is an initial speed of the inertia running, and in a case of the down-grade road, the vehicle speed difference is increased with increasing target upper limit vehicle speed Vmax.

Meanwhile, the road grade may be obtained by a known method in the technical field thereof, and this may be derived from change in vehicle front-back direction acceleration detected by a vehicle front-back direction acceleration sensor 86, for example. Therefore, the main ECU 71 of the present embodiment obtains the road grade while always observing the change in the vehicle front-back direction acceleration during the running. As for information of the road grade, each time a new value thereof is calculated, this replaces an older one and is stored in the RAM or the like of the main ECU 71.

In the present embodiment, the running time of the inertia running in the actual acceleration/deceleration running pattern can be derived by setting the target upper limit vehicle speed Vmax and the target lower limit vehicle speed Vmin in this manner. That is to say, the running time of the inertia running is determined by the target upper limit vehicle speed Vmax, the target lower limit vehicle speed Vmin, and the road grade, which are variables, so that this can obtained by specifying the three values. In the present embodiment, map data (not shown) in which a correspondence relationship between the three values and the running time of the inertia running is obtained by the experiment and the simulation in advance is prepared, and the actual acceleration/deceleration running pattern generating means of the main ECU 71 is allowed to calculate the running time of the inertia running in the actual acceleration/deceleration running pattern by using the same.

On the other hand, the running time of the acceleration running in the actual acceleration/deceleration running pattern is determined by a size of the acceleration of the vehicle at that time in addition to the target upper limit vehicle speed Vmax, the target lower limit vehicle speed Vmin and the road grade. That is to say, the running time of the acceleration running changes based on the four values. In the present embodiment, the actual acceleration/deceleration running pattern generating means of the main ECU 71 is allowed to obtain the acceleration (strictly, following best acceleration $G_{best}$) of the vehicle at the time of the acceleration running, map data (not shown) in which the correspondence relationship between the four values, which are the acceleration, the target upper limit vehicle speed Vmax, the target lower limit vehicle speed Vmin and the road grade, and the running time of the acceleration running is obtained in advance by the experiment and the simulation is prepared, and the actual acceleration/deceleration running pattern generating means is allowed to calculate the running time of the acceleration running by using the same.

Figure 4:
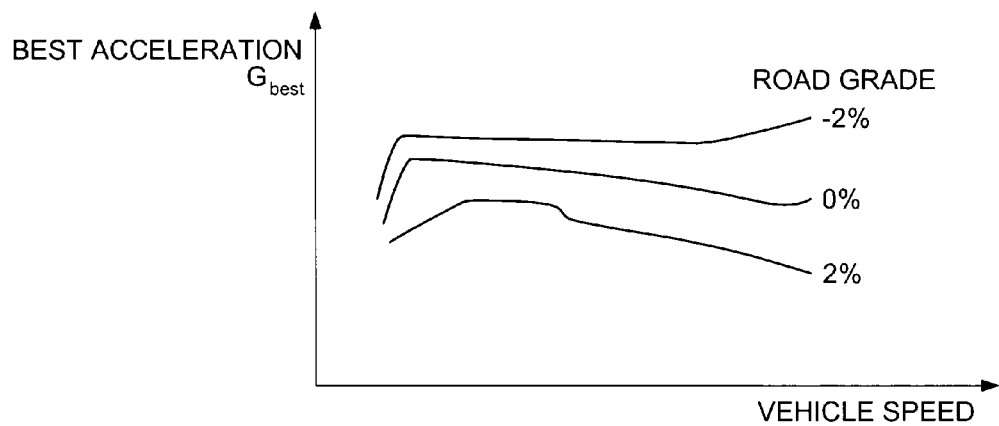
FIG. 4 is a diagram illustrating one example of map data for obtaining best acceleration.

Herein, when the acceleration of the vehicle at the time of the acceleration running is too large, it is rapidly accelerated from the target lower limit vehicle speed Vmin to the target upper limit vehicle speed Vmax, so that the driver feels uncomfortable by the drastic change in the vehicle speed. On the other hand, when the acceleration is too small, it takes long time to reach the target upper limit vehicle speed Vmax, so that the fuel is continuously injected during the time period and the fuel consumption deteriorates. For that reason, in the present embodiment, the acceleration of the vehicle, at the time of acceleration running with which the uncomfortable feeling of the driver and the deterioration of the fuel consumption are inhibited in a balanced manner, (hereinafter, referred to as "best acceleration") $G_{best}$ is set. In the present embodiment, map data shown in FIG. 4 in which the correspondence relationship among the best acceleration $G_{best}$, the vehicle speed and the road grade is obtained in advance by the experiment and the simulation is prepared, and the actual acceleration/deceleration running pattern generating means of the main ECU 71 is allowed to calculate the best acceleration $G_{best}$ excellent in thermal efficiency of the internal-combustion engine 10 by using the same. For example, in a case of the up-grade road, when the best acceleration $G_{best}$ is increased, difference between the same and the deceleration in the inertia running is increased and the driver easily feels uncomfortable. On the other hand, in a case of the down-grade road, if the best acceleration $G_{best}$ is not increased, it takes long time to reach the target upper limit vehicle speed Vmax and the fuel consumption deteriorates. For that reason, the best acceleration $G_{best}$ of the present embodiment is set so as to be smaller on the flat road (the road grade of 0%) than on the down-grade road (for example, the road grade of −2%), and smaller on the up-grade road (for example, the road grade of 2%) than on the flat road, as shown in FIG. 4.

In the present embodiment, an acceleration/deceleration period (hereinafter, referred to as a "actual acceleration/deceleration period") T1 in the actual acceleration/deceleration running pattern is obtained by adding the running time of the inertia running and the running time of the acceleration running. Based on this, it may be said that in the actual acceleration/deceleration running pattern, the deceleration and the acceleration of the vehicle associated with the inertia running and the acceleration running are performed with the actual acceleration/deceleration period T1. The actual acceleration/deceleration running pattern generating means of the main ECU 71 is allowed to calculate the actual acceleration/deceleration period T1.

Also, in the present embodiment, the actual acceleration/deceleration running pattern is specifically generated after specifying the target upper limit vehicle speed Vmax, the target lower limit vehicle speed Vmin, and the running time of the inertia running and of the acceleration running. Herein, as shown in FIG. 3, the deceleration before shifting from the inertia running to the acceleration running is gradually decreased, and the acceleration after shifting to the acceleration running is gradually increased such that the drastic change in the acceleration and deceleration does not occur when switching between the inertia running and acceleration running. Further, when switching from the acceleration running to the inertia running also, the acceleration before shifting from the acceleration running to the inertia running is gradually decreased, and the deceleration after shifting to the inertia running is gradually increased.

From the generated actual acceleration/deceleration running pattern, restart timing of the internal-combustion engine 10 (at the time of starting the acceleration running or slightly earlier than this) is specified, and restop timing (at the time of starting the inertia running or slightly earlier than this) is also specified. Further, from the actual acceleration/deceleration running pattern, a fuel amount per one period to be consumed from the restart to the restop of the internal-combustion engine 10 can be derived from the change in the vehicle speed, so that fuel consumption in the actual acceleration/deceleration running pattern (hereinafter, referred to as "actual acceleration/deceleration running pattern fuel consumption") $Mt_{real}$ can be obtained.

Also, during the acceleration running, the first motor/generator 31 operates as the generator by a part of the engine power (divided power) of the internal-combustion engine 10. For that reason, when the charge amount of the battery 41 does not reach the target charge amount at the time, the motor/generator ECU 73 charges the battery 41 with the generated electric power until this reaches the target charge amount.

The actual acceleration/deceleration period T1 in the actual acceleration/deceleration running pattern is not necessarily the best period for solving the uncomfortable feeling of the driver associated with the change in the vehicle speed. That is to say, when the acceleration and the deceleration are frequently repeated with short period, the driver feels uncomfortable by the change in the acceleration and deceleration. For that reason, it is configured that the running with the actual acceleration/deceleration running pattern is not carried out unless the actual acceleration/deceleration period T1 is not smaller than a certain value (hereinafter, referred to as a "reference acceleration/deceleration period") T0. Therefore, when the actual acceleration/deceleration period T1 is shorter than the reference acceleration/deceleration period T0, corrected acceleration/deceleration running pattern in which the acceleration/deceleration period is made closer to the reference acceleration/deceleration period T0 than the actual acceleration/deceleration period T1 is generated. That is to say, the corrected acceleration/deceleration running pattern is obtained by elongating the actual acceleration/deceleration period T1 of the actual acceleration/deceleration running pattern, and corrected acceleration/deceleration running pattern generating means of the main ECU 71 is allowed to generate the same.

Also, the reference acceleration/deceleration period T0 is the acceleration/deceleration period in which the improvement of the fuel consumption and the resolution of the uncomfortable feeling of the driver associated with the change in the vehicle speed and acceleration and deceleration of the vehicle can go together, and a value of each road grade is obtained in advance by the experiment and the simulation and is prepared as the map data, for example. Further, the reference acceleration/deceleration period T0 may be set in advance by the experiment or the like for the purpose of improving the fuel consumption, and may be set in advance by the experiment or the like for the purpose of solving the uncomfortable feeling of the driver. In this case also, the reference acceleration/deceleration period T0 may be prepared as the map data. Further, the reference acceleration/deceleration period T0 may be made a value changeable by the driver with a switch or the like (not shown) in a vehicle cabin according to preference. In this case, it is possible to allow the driver to select the acceleration/deceleration period in which the fuel consumption and the resolution of the uncomfortable feeling of the driver can go together out of some types, and it is possible to allow the driver to select the acceleration/deceleration period capable of improving the fuel consumption and the acceleration/deceleration period capable of solving the uncomfortable feeling of the driver in addition to or in place of the same. In this case, the reference acceleration/deceleration period T0 for each selection pattern may be set based on the experiment or the like performed in advance. In addition, it is possible to study the fuel consumption during the actual running to update the above-described map data and the selected pattern based on the studied value, in order to match with the change in running environment and change in preference of the driver (preferred running pattern of the driver such as emphasize on the acceleration and deceleration and emphasize on the fuel consumption, for example).

[Corrected Acceleration/Deceleration Running Pattern]

Hereinafter, the corrected acceleration/deceleration running pattern of the present embodiment is described. As the corrected acceleration/deceleration running pattern of the present embodiment, the corrected acceleration/deceleration running pattern to make the acceleration/deceleration period closer to the reference acceleration/deceleration period T0 by correcting the acceleration of the vehicle at the time of the acceleration running smaller relative to the actual acceleration/deceleration running pattern (hereinafter, referred to as a "first corrected acceleration/deceleration running pattern"), the corrected acceleration/deceleration running pattern to make the acceleration/deceleration period closer to the reference acceleration/deceleration period T0 by correcting the deceleration at the time of the inertia running smaller relative to the actual acceleration/deceleration running pattern (hereinafter, referred to as a "second corrected acceleration/deceleration running pattern"), and the corrected acceleration/deceleration running pattern to make the acceleration/deceleration period closer to the reference acceleration/deceleration period T0 by adding the constant vehicle speed running in the actual acceleration/deceleration running pattern to the actual acceleration/deceleration period (hereinafter, referred to as a "third corrected acceleration/deceleration running pattern") are illustrated.

[First Corrected Acceleration/Deceleration Running Pattern]

First, the first corrected acceleration/deceleration running pattern is described with reference to FIG. 5.

Figure 5:
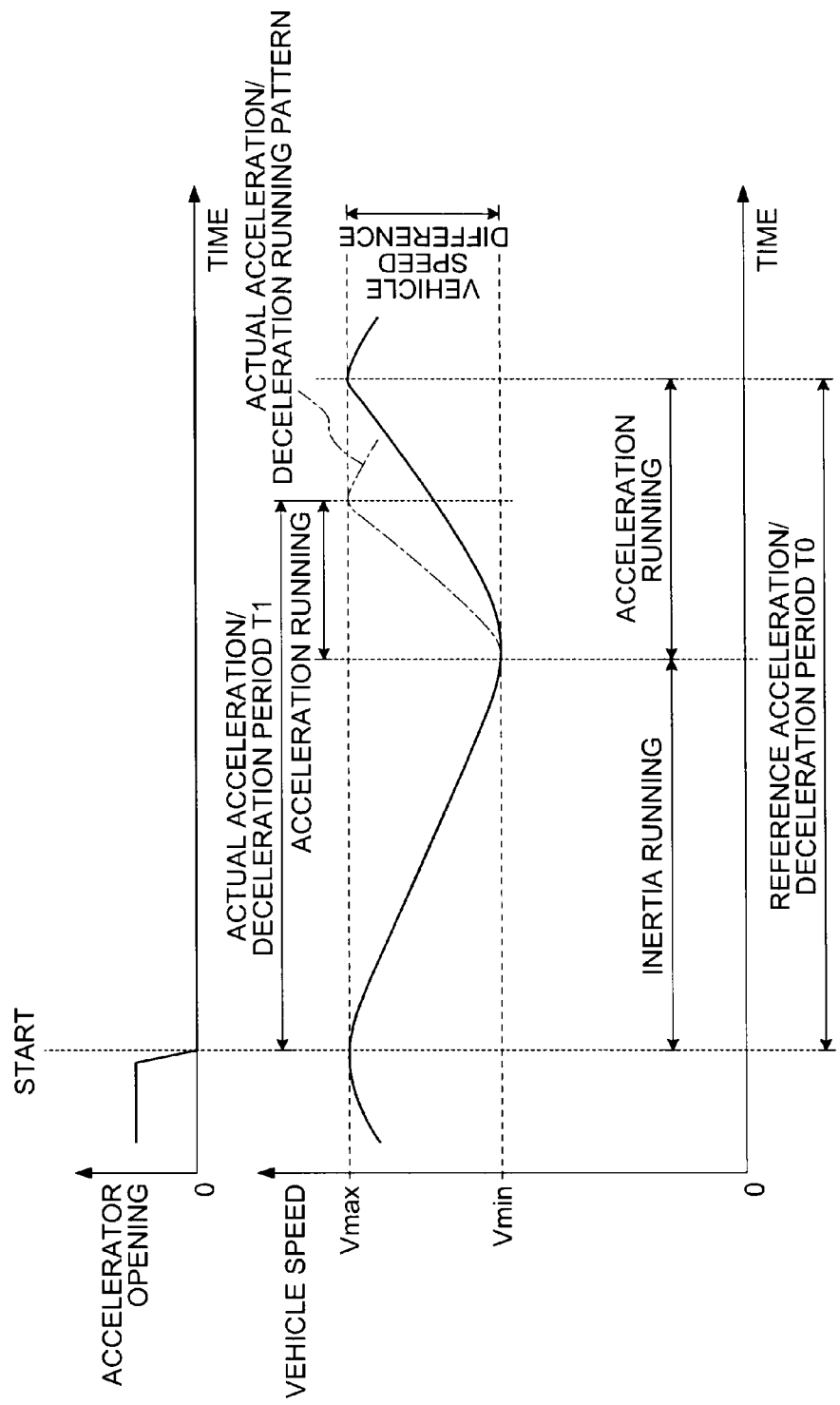
FIG. 5 is a diagram illustrating one example of a first corrected acceleration/deceleration running pattern.
Figure 6:
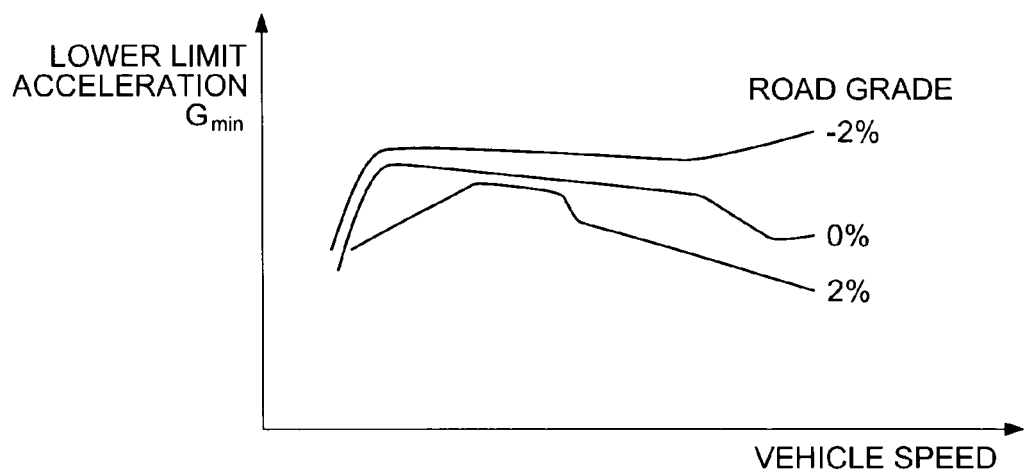
FIG. 6 is a diagram illustrating one example of map data for obtaining lower limit acceleration.

The first corrected acceleration/deceleration running pattern shown in FIG. 5 is obtained by elongating the running time of the acceleration running by difference in time between the actual acceleration/deceleration period T1 and the reference acceleration/deceleration period T0, and by making the acceleration of the vehicle smaller than the best acceleration $G_{best}$ to a size corresponding to the running time after the elongation. That is to say, the first corrected acceleration/deceleration running pattern is to elongate the acceleration/deceleration period to the reference acceleration/deceleration period T0 by accelerating more gently than in the case of the actual acceleration/deceleration running pattern, thereby solving the uncomfortable feeling of the driver associated with the change in the acceleration and deceleration (frequent switching between the acceleration running and the inertia running).

Herein, since the first corrected acceleration/deceleration running pattern is obtained by elongating the running time of the acceleration running, there is a possibility that the amount of fuel consumed increases than in the case of the actual acceleration/deceleration running pattern to deteriorate the fuel consumption. Herein, however, so as not to bring the uncomfortable feeling to the driver even if the fuel consumption deteriorates a little, it is configured to select not the actual acceleration/deceleration running pattern but the first corrected acceleration/deceleration running pattern when there is a possibility that the driver feels uncomfortable with the running with the actual acceleration/deceleration running pattern.

On the other hand, it is not preferable to allow significant deterioration of the fuel consumption so as not to bring the uncomfortable feeling to the driver. For that reason, worst fuel consumption allowable with the acceleration/deceleration running pattern is defined, and fuel consumption of the first corrected acceleration/deceleration running pattern (hereinafter, referred to as "first corrected acceleration/deceleration running pattern fuel consumption) Mt1 is prevented from being worse than the worst fuel consumption. In the present embodiment, smallest acceleration of the vehicle next to the worst fuel consumption (hereinafter, referred to as "lower limit acceleration") $G_{min}$ is derived, and this is made a guard value on the lower limit side of the acceleration of the vehicle at the time of the acceleration running after the correction. When the acceleration after correction is not larger than the lower limit acceleration $G_{min}$, the lower limit acceleration $G_{min}$ is set as final acceleration at the time of the acceleration running. Therefore, at that time, although the acceleration/deceleration period of the first corrected acceleration/deceleration running pattern becomes shorter than the reference acceleration/deceleration period T0, the significant deterioration of the fuel consumption is prevented even if the driver feels uncomfortable a little. Herein, as in the case of the best acceleration $G_{best}$ map data shown in FIG. 6 in which the correspondence relationship among the lower limit acceleration $G_{min}$, the target lower limit vehicle speed Vmin and the road grade is obtained in advance by the experiment and the simulation is prepared, and the corrected acceleration/deceleration running pattern generating means of the main ECU 71 is allowed to calculate the lower limit acceleration by using the same.

Also, the final acceleration at the time of the acceleration running may be further decreased when the above-described acceleration after correction is larger than the lower limit acceleration $G_{min}$. That is to say, the acceleration/deceleration period of the first corrected acceleration/deceleration running pattern may be made longer than the reference acceleration/deceleration period T0 by making the acceleration at the time of the acceleration running smaller than the above-described acceleration after correction and further elongating the running time of the acceleration running from a state shown in FIG. 5. This makes it possible that the first corrected acceleration/deceleration running pattern at that time further solves the uncomfortable feeling associated with the large change in the acceleration and deceleration of the vehicle while preventing the significant deterioration of the fuel consumption.

When generating the first corrected acceleration/deceleration running pattern, as in the case of the actual acceleration/deceleration running pattern, it is adjusted such that drastic change in the acceleration and deceleration does not occur when switching between the inertia running and the acceleration running. Then, the first corrected acceleration/deceleration running pattern fuel consumption Mt1 is obtained by deriving the amount of fuel consumed in an activation period of the internal-combustion engine 10 per one period based on the vehicle speed change of the generated first corrected acceleration/deceleration running pattern as in the case of the actual acceleration/deceleration running pattern.

In the first corrected acceleration/deceleration running pattern also, when the charge amount of the battery 41 does not reach the target charge amount during the acceleration running, the motor/generator ECU 73 charges the battery 41 with the generated electric power of the first motor/generator 31 until reaching the target charge amount. At that time, in the first corrected acceleration/deceleration running pattern, since the acceleration at the time of the acceleration running is corrected to be smaller than in the case of the actual acceleration/deceleration running pattern, the generated electric power amount in the first motor/generator 31 increases as compared to a case of the actual acceleration/deceleration running pattern associated with the elongation of the activation time of the internal-combustion engine 10. For that reason, in the present embodiment, the target charge amount setting means is allowed to set again the target charge amount to a larger value corresponding to the acceleration after correction. This makes it possible that the battery 41 is charged with electric power larger than that in the actual acceleration/deceleration running pattern when the first corrected acceleration/deceleration running pattern is selected.

[Second Corrected Acceleration/Deceleration Running Pattern]

Next, the second corrected acceleration/deceleration running pattern is described with reference to FIG. 7.

Figure 7:
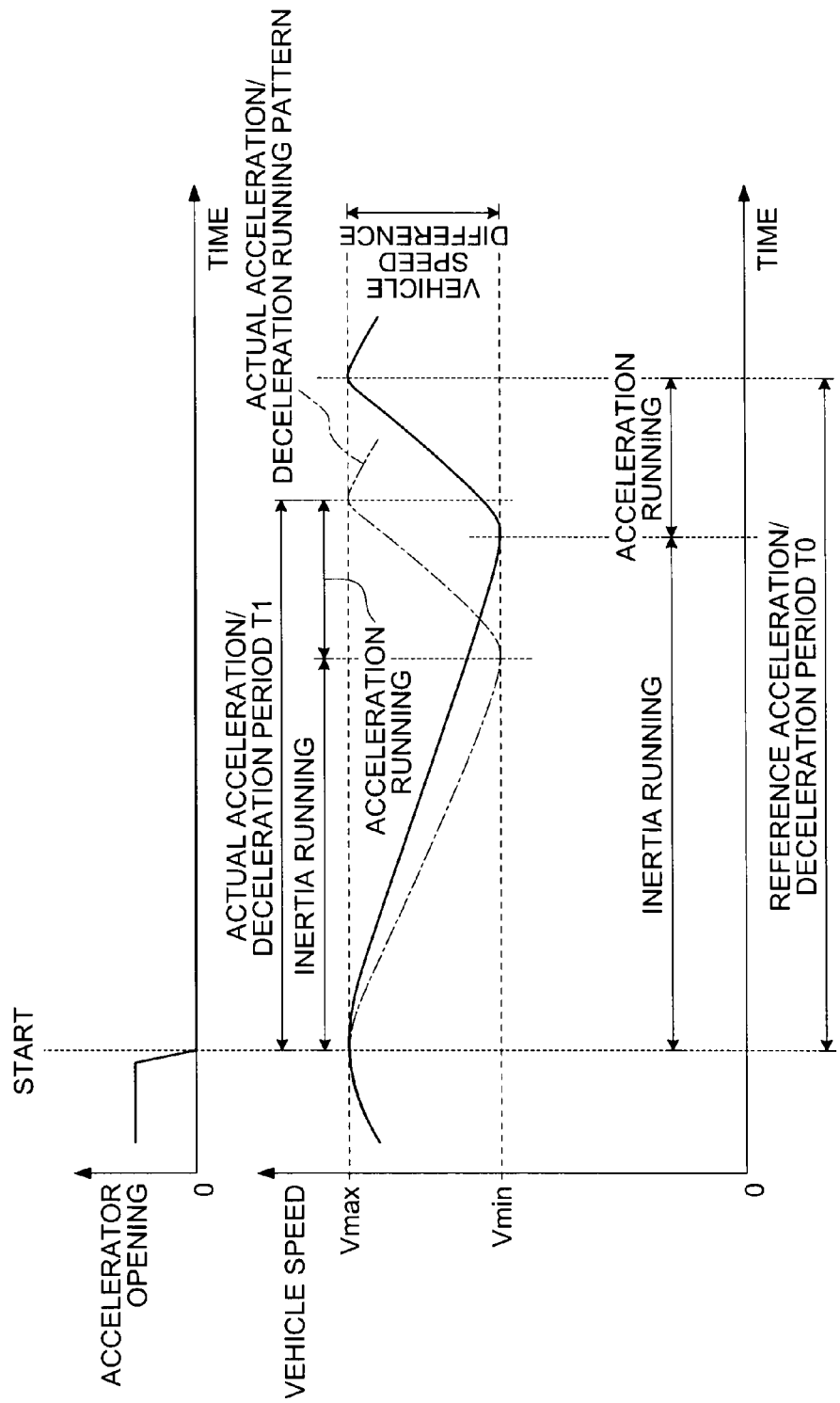
FIG. 7 is a diagram illustrating one example of a second corrected acceleration/deceleration running pattern.

The second corrected acceleration/deceleration running pattern shown in FIG. 7 is obtained by elongating the running time of the inertia running by difference in time between the actual acceleration/deceleration period T1 and the reference acceleration/deceleration period T0 and by making the deceleration of the vehicle smaller to a size corresponding to the running time after the elongation. In the present embodiment, for this purpose, the second motor/generator 32 is operated as the motor during the inertia running to add the motor power. The second corrected acceleration/deceleration running pattern is to elongate the acceleration/deceleration period to the reference acceleration/deceleration period T0 by decelerating more gently than in the case of the actual acceleration/deceleration running pattern, thereby solving the uncomfortable feeling of the driver associated with the change in the acceleration and deceleration (frequent switching between the acceleration running and the inertia running). Herein, the corrected acceleration/deceleration running pattern generating means of the main ECU 71 calculates supplied electric power to the second motor/generator 32, which generates the motor power capable of realizing the running time of the inertia running after the elongation. The supplied electric power is made larger in the case of up-grade than in the case of down-grade.

In the second corrected acceleration/deceleration running pattern, the running time of the acceleration running is not changed relative to the actual acceleration/deceleration running pattern (in other words, remains the best acceleration $G_{best}$), so that the fuel consumption substantially the same as in the case of the actual acceleration/deceleration running pattern when observing only the time of the acceleration/deceleration running. However, in the second corrected acceleration/deceleration running pattern, the second motor/generator 32 is operated as the motor by utilizing the electric power of the battery 41 during the inertia running, so that it is necessary to recover at least the electric power consumption of the battery 41 associated with the operation of the second motor/generator 32 during the inertia running after the acceleration/deceleration running in order to prevent the storage amount of the battery 41 from lowering. Then, a part of the engine power (divided power) of the internal-combustion engine 10 is utilized for recovering the electric power consumption, so that the fuel consumption deteriorates when observing an entire running state including recovery time. That is to say, fuel consumption of the second corrected acceleration/deceleration running pattern (hereinafter, referred to as "second corrected acceleration/deceleration running pattern fuel consumption") Mt2 in view of the generated electric power by the internal-combustion engine 10 (in other words, the supplied electric power to the second motor/generator 32 during the inertia running) deteriorates than in the case of the actual acceleration/deceleration running pattern fuel consumption $Mt_{real}$. The amount of fuel consumed in the activation period of the internal-combustion engine 10 per one period based on the vehicle speed change in the second corrected acceleration/deceleration running pattern and the fuel amount of the internal-combustion engine 10 required for recovering the supplied electric power to the second motor/generator 32 per one period are derived, and the second corrected acceleration/deceleration running pattern fuel consumption Mt2 is obtained based on them. Meanwhile, although a part of the electric power consumption is actually recovered by the generated electric power of the first motor/generator 31 during the acceleration running, the generated power is made during the acceleration running also in the actual acceleration/deceleration running pattern, so that they are same in terms of deterioration of the fuel consumption.

Herein, in a case in which the deterioration of the second corrected acceleration/deceleration running pattern fuel consumption Mt2 is in an allowable range (the worst fuel consumption allowable in the above-described acceleration/deceleration running pattern is set as a limit of deterioration), the running time of the inertia running may be further elongated by increasing the supplied electric power and the electric power supplying time to the second motor/generator 32. That is to say, the acceleration/deceleration period of the second corrected acceleration/deceleration running pattern may be made longer than the reference acceleration/deceleration period T0 by further elongating the running time of the inertia running from a state shown in FIG. 7. By doing so, the second corrected acceleration/deceleration running pattern at that time can further solve the uncomfortable feeling associated with the large change in the acceleration and deceleration of the vehicle while preventing the significant deterioration of the fuel consumption.

When generating the second corrected acceleration/deceleration running pattern, it is adjusted such that the drastic change in the vehicle front-back direction acceleration does not occur when switching between the inertia running and the acceleration running, as in the case of the actual acceleration/deceleration running pattern.

[Third Corrected Acceleration/Deceleration Running Pattern]

Next, a third corrected acceleration/deceleration running pattern is described with reference to FIG. 8.

Figure 8:
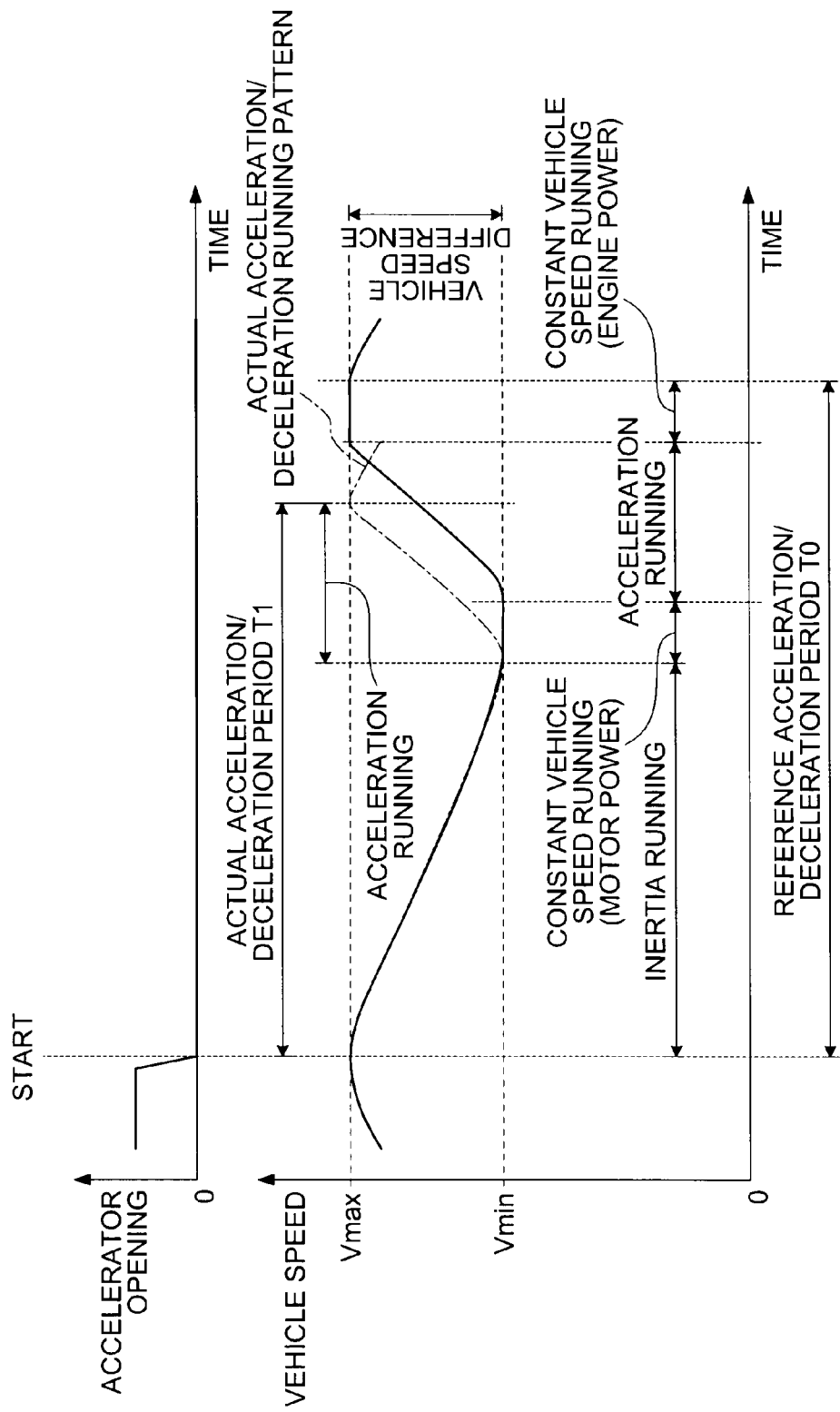
FIG. 8 is a diagram illustrating one example of a third corrected acceleration/deceleration running pattern.

The third corrected acceleration/deceleration running pattern shown in FIG. 8 is obtained by adding the constant vehicle speed running in the actual acceleration/deceleration period of the actual acceleration/deceleration running pattern by difference in time between the actual acceleration/deceleration period T1 and the reference acceleration/deceleration period T0. That is to say, the third corrected acceleration/deceleration running pattern is to elongate the acceleration/deceleration period to the reference acceleration/deceleration period T0 by the addition of the constant vehicle speed running, thereby solving the uncomfortable feeling of the driver associated with the change in the acceleration and deceleration (frequent switching between the acceleration running and the inertia running).

Specifically, in the third corrected acceleration/deceleration running pattern, at least one of the constant vehicle speed running at the target lower limit vehicle speed Vmin (hereinafter, referred to as "low-speed side constant vehicle speed running") and the constant vehicle speed running at the target upper limit vehicle speed Vmax (hereinafter, referred to as "high-speed side constant vehicle speed running") is added. The low-speed side constant vehicle speed running is realized by utilizing the motor power of the second motor/generator 32 when reaching the target lower limit vehicle speed Vmin when shifting from the inertia running to the acceleration running. On the other hand, the high-speed side constant vehicle speed running is realized by utilizing the engine power of the internal-combustion engine 10 when reaching the target upper limit vehicle speed Vmax when shifting from the acceleration running to the inertia running.

When generating the third corrected acceleration/deceleration running pattern, it is configured that the vehicle front-back direction acceleration (deceleration) before shifting from the inertia running to the low-speed side constant vehicle speed running gradually decreases and the vehicle front-back direction acceleration (acceleration) after shifting from the low-speed side constant vehicle speed running to the acceleration running gradually increases. Also, the vehicle front-back direction acceleration (acceleration) before shifting from the acceleration running to the high-speed side constant vehicle speed running is gradually decreased and the vehicle front-back direction acceleration (deceleration) after shifting from the high-speed side constant vehicle speed running to the inertia running is gradually increased.

In the present embodiment, both of the low-speed side constant vehicle speed running and the high-speed side constant vehicle speed running are added to compensate the difference in time between the actual acceleration/deceleration period T1 and the reference acceleration/deceleration period T0. For example, the distribution of the running time of the low-speed side constant vehicle speed running and that of the high-speed side constant speed running may be set such that the electric power of the battery 41 consumed by the low-speed side constant vehicle speed running and the electric power generated by the engine power of the internal-combustion engine 10 by the high-speed side constant vehicle speed running are equal to each other. By doing so, in this case, the storage amount of the battery 41 is prevented from decreasing, so that it is not necessary to perform the operation of the internal-combustion engine 10 for recovering the storage amount of the battery 41 after the running with the third corrected acceleration/deceleration running pattern, and deterioration of the fuel consumption associated with the operation of the internal-combustion engine 10 is prevented.

Also, the amount of fuel consumed in the acceleration running of the internal-combustion engine 10 per one period based on the vehicle speed change of the third corrected acceleration/deceleration running pattern and the fuel amount of the internal-combustion engine 10 required for recovering the supplied electric power to the second motor/generator 32 in the low-speed side constant vehicle speed running per one period or the amount of fuel consumed by the internal-combustion engine 10 in the high-speed side constant vehicle speed running per one period are derived, and the fuel consumption (hereinafter, referred to as "third corrected acceleration/deceleration running pattern fuel consumption") Mt3 of the third corrected acceleration/deceleration running pattern at that time may be obtained based on them.

Further, in a case in which the deterioration of the third corrected acceleration/deceleration running pattern fuel consumption Mt3 is in an allowable range (the worst fuel consumption allowable in the above-described acceleration/deceleration running pattern is made the limit of deterioration), the running time of the low-speed side constant vehicle speed running and that of the high-speed side constant vehicle speed running may be further elongated. That is to say, the acceleration/deceleration period of the third corrected acceleration/deceleration running pattern may be made longer than the reference acceleration/deceleration period T0 by further elongating the running times from a state shown in FIG. 8. By doing so, the third corrected acceleration/deceleration running pattern at that time can further solve the uncomfortable feeling associated with the large change in the acceleration and deceleration of the vehicle while preventing the significant deterioration of the fuel consumption.

In the present embodiment, out of the above-described corrected acceleration/deceleration running patterns (the first corrected acceleration/deceleration running pattern, the second corrected acceleration/deceleration running pattern and the third corrected acceleration/deceleration running pattern), the one having the best fuel consumption is set as the best acceleration/deceleration running pattern. The best acceleration/deceleration running pattern is the acceleration/deceleration running pattern in which the improvement of the fuel consumption and inhibition of the uncomfortable feeling for the driver associated with the vehicle speed and the acceleration and deceleration of the vehicle can go together.

Herein, although it is possible to allow the vehicle to run with the best acceleration/deceleration running pattern, from a viewpoint of solving the uncomfortable feeling of the driver, it is the constant vehicle speed running pattern to maintain the constant vehicle speed that may solve this the best, so that it is preferable to put the constant vehicle speed running pattern also as a candidate of the running patterns. However, in the running with the constant vehicle speed running pattern, it is necessary to transmit the power of the internal-combustion engine 10 and the second motor/generator 32 operated as the motor to the drive wheels W, W in order to maintain the vehicle speed constant even after the accelerator off. Then, the fuel is consumed for the engine power of the internal-combustion engine 10 during the running, and the fuel is consumed in the internal-combustion engine 10 thereafter in order to recover the electric power of the battery 41 consumed for the motor power of the second motor/generator 32 during the running, so that fuel consumption (hereinafter, referred to as "constant vehicle speed running pattern fuel consumption") $M_{const}$ should be taken into account also for the constant vehicle speed running pattern. Then, running pattern setting means of the main ECU 71 of the present embodiment compares the constant vehicle speed running pattern fuel consumption $M_{const}$ to fuel consumption of the best acceleration/deceleration running pattern (hereinafter, referred to as "best acceleration/deceleration running pattern fuel consumption") $Mt_{best}$ to adopt the running pattern having more excellent fuel consumption. Meanwhile, the power for maintaining the constant vehicle speed must be made larger on the flat road than on the down-grade road, and on the up-grade road than on the flat road.

Herein, an intermediate vehicle speed between the above-described target upper limit vehicle speed Vmax and the target lower limit vehicle speed Vmin is set as the constant vehicle speed $V_{const}$ in the constant vehicle speed running pattern of the present embodiment. In addition, the constant vehicle speed running pattern fuel consumption $M_{const}$ is obtained by deriving the amount of fuel consumed by the internal-combustion engine 10 per predetermined time (herein, this conforms to the above-described reference acceleration/deceleration period T0 for convenience) and the fuel amount of the internal-combustion engine 10 required for recovering the supplied electric power to the second motor/generator 32 per predetermined time. Constant vehicle speed running pattern generating means of the main ECU 71 is allowed to carry out the generation of the constant vehicle speed running pattern and the calculation of the constant vehicle speed running pattern fuel consumption $M_{const}$.

Hereinafter, running pattern setting operation of the vehicle running control apparatus of the present embodiment is described with reference to the flowcharts in FIGS. 9 and 10.

First, the main ECU 71 observes the accelerator opening detected by the accelerator opening sensor 84 to judge whether the accelerator is off or not, as shown in the flowchart in FIG. 9 (step ST1). The judgment is always carried out.

When the accelerator is not off, the main ECU 71 terminates this operation once. On the other hand, when it is judged that the accelerator is off, the actual acceleration/deceleration running pattern generating means of the main ECU 71 reads information of the road grade stored in the RAM or the like (step ST2).

Also, the actual acceleration/deceleration running pattern generating means sets the target upper limit vehicle speed Vmax and the target lower limit vehicle speed Vmin (step ST3). At that time, the main ECU 71 sets the vehicle speed at the time when the accelerator off is detected as the target upped limit vehicle speed Vmax. Also, the main ECU 71 reads the vehicle speed difference by checking the target upper limit vehicle speed Vmax and the information of the road grade at the above-described step ST2 against the map data in FIG. 3. Then, the main ECU 71 sets the vehicle speed obtained by subtracting the vehicle speed difference from the target upper limit vehicle speed Vmax as the target lower limit vehicle speed Vmin.

Also, the actual acceleration/deceleration running pattern generating means obtains the best acceleration $G_{best}$ at the time of the acceleration running in the actual acceleration/deceleration running pattern, based on the information of the road grade at the above-described step ST2 and the target upper limit vehicle speed Vmax and the target lower limit vehicle speed Vmin at the above-described step ST3 (step ST4).

Also, the actual acceleration/deceleration running pattern generating means calculates the actual acceleration/deceleration period T1 in the actual acceleration/deceleration running pattern (step ST5). At that time, the actual acceleration/deceleration running pattern generating means obtains the running time of the inertia running based on the information of the road grade at the above-described step ST2, and the target upper limit vehicle speed Vmax and the target lower limit vehicle speed Vmin at the above-described step ST3. Further, the actual acceleration/deceleration running pattern generating means obtains the running time of the acceleration running based on the information of the road grade at the above-described step ST2, the target upper limit vehicle speed Vmax and the target lower limit vehicle speed Vmin at the above-described step ST3, and the best acceleration $G_{best}$ at the above-described step ST4. Then, the main ECU 71 derives the actual acceleration/deceleration period T1 by adding the running time of the inertia running and the running time of the acceleration running.

After specifying the target upped limit vehicle speed Vmax, the target lower limit vehicle speed Vmin, and the actual acceleration/deceleration period T1 (the running time of the inertia running and the running time of the acceleration running) in this manner, the main ECU 71 generates the actual acceleration/deceleration running pattern shown in FIG. 2, for example, by using them (step ST6). At that time, the actual acceleration/deceleration running pattern generating means gradually decreases the deceleration of the vehicle before shifting from the inertia running to the acceleration running, and gradually increases the acceleration of the vehicle after shifting to the acceleration running so as to smoothly lead to the best acceleration $G_{best}$. Also, the actual acceleration/deceleration running pattern generating means gradually decreases the acceleration of the vehicle before shifting from the acceleration running to the inertia running from the best acceleration $G_{best}$ and gradually increases the deceleration of the vehicle after shifting to the inertia running. By doing so, drastic change in the acceleration and deceleration when switching between the inertia running and the acceleration running can be inhibited, and the uncomfortable feeling for the driver due to the drastic change in the acceleration and deceleration of the vehicle can be prevented.

The actual acceleration/deceleration running pattern generating means calculates the actual acceleration/deceleration running pattern fuel consumption $Mt_{real}$ after generating the actual acceleration/deceleration running pattern (step ST7). At that time, the actual acceleration/deceleration running pattern generating means obtains the amount of fuel consumed by the internal-combustion engine 10 per one period including the inertia running and the acceleration running, and obtains running distance of the vehicle in one period, based on the generated actual acceleration/deceleration running pattern. Then, the actual acceleration/deceleration running pattern generating means obtains the actual acceleration/deceleration running pattern fuel consumption $Mt_{real}$ based on the amount of fuel consumed and the running distance.

After that, acceleration/deceleration period comparing means of the main ECU 71 compares the actual acceleration/deceleration period T1 of the actual acceleration/deceleration running pattern to the above-described reference acceleration/deceleration period T0 (step ST8).

When it is judged that the actual acceleration/deceleration period T1 is not shorter than the reference acceleration/deceleration period T0 at the step ST8 (that is to say, when this is judged to be an appropriate acceleration/deceleration period, which does not change the acceleration and deceleration of the vehicle so largely as to bring the uncomfortable feeling to the driver), the best acceleration/deceleration running pattern setting means of the main ECU 71 shifts to a step ST10 to be described later to set the actual acceleration/deceleration running pattern fuel consumption $Mt_{real}$ as the best acceleration/deceleration running pattern fuel consumption $Mt_{best}$. In this case, the best acceleration/deceleration running pattern setting means sets the actual acceleration/deceleration running pattern as the best acceleration/deceleration running pattern at a step ST11 to be described later.

On the other hand, when it is judged that the actual acceleration/deceleration period T1 is shorter than the reference acceleration/deceleration period T0 (that is to say, when this is judged to be the acceleration/deceleration period in which the change in the acceleration and deceleration of the vehicle is large and possibly brings the uncomfortable feeling to the driver) at the above-described step ST8, the corrected acceleration/deceleration running pattern generating means of the main ECU 71 generates the corrected acceleration/deceleration running pattern capable of inhibiting the uncomfortable feeling and calculates the fuel consumption (step ST9). The step ST9 is described in detail by using the flowchart in FIG. 10.

The corrected acceleration/deceleration running pattern generating means generates the first corrected acceleration/deceleration running pattern (step ST9A).

At that time, the corrected acceleration/deceleration running pattern generating means obtains the difference between the actual acceleration/deceleration period T1 and the reference acceleration/deceleration period T0, and obtains the acceleration of the vehicle at the time of the acceleration running capable of elongating the running time of the acceleration running relative to the actual acceleration/deceleration running pattern by the difference in time. When calculating, the acceleration of the vehicle at the time of the acceleration running is obtained as a value smaller than the best acceleration $G_{best}$ as described above. Herein, the corrected acceleration/deceleration running pattern generating means compares the acceleration of the vehicle at the time of the acceleration running to the above-described lower limit acceleration $G_{min}$, and determines the final acceleration of the vehicle at the time of acceleration running based on the comparison result. That is to say, as described above, when the calculated acceleration of the vehicle at the time of the acceleration running is larger than the lower limit acceleration $G_{min}$, the acceleration of the vehicle at the time of the acceleration running or the acceleration smaller than this is set as the final acceleration of the vehicle at the time of the acceleration running. On the other hand, when the calculated acceleration of the vehicle at the time of the acceleration running is not larger than the lower limit acceleration $G_{min}$, the lower limit acceleration $G_{min}$ is set as the final acceleration of the vehicle at the time of the acceleration running. Therefore, length of the running time of the acceleration running is different according to the final acceleration of the vehicle at the time of the acceleration running.

The corrected acceleration/deceleration running pattern generating means generates the first corrected acceleration/deceleration running pattern shown in FIG. 5, for example, by using the target upper limit vehicle speed Vmax, the target lower limit vehicle speed Vmin and the running time of the inertia running, which are same as those of the actual acceleration/deceleration running pattern, and the running time of the acceleration running elongated this time. That is to say, in the first corrected acceleration/deceleration running pattern, the acceleration/deceleration period is elongated than in the actual acceleration/deceleration running pattern by elongating the running time of the acceleration running. Therefore, when the actual acceleration/deceleration running pattern brings the uncomfortable feeling to the driver due to the short acceleration/deceleration period, the first corrected acceleration/deceleration running pattern can inhibit the uncomfortable feeling.

Herein, when generating, the deceleration of the vehicle before shifting from the inertia running to the acceleration running is gradually decreased, and the acceleration of the vehicle after shifting to the acceleration running is gradually increased so as to smoothly lead to the final acceleration of the vehicle at the time of the acceleration running. In addition, at that time, the acceleration of the vehicle before shifting from the acceleration running to the inertia running is gradually decreased from the final acceleration of the vehicle at the time of the acceleration running, and the deceleration of the vehicle after shifting to the inertia running is gradually increased. By doing so, it is possible to inhibit the drastic change in the acceleration and deceleration of the vehicle when switching between the inertia running and the acceleration running, and the uncomfortable feeling for the driver due to the drastic change in the acceleration and deceleration of the vehicle can be prevented.

The corrected acceleration/deceleration running pattern generating means calculates the first corrected acceleration/deceleration running pattern fuel consumption Mt1 after generating the first corrected acceleration/deceleration running pattern (step ST9B). At that time, the corrected acceleration/deceleration running pattern generating means obtains the amount of fuel consumed by the internal-combustion engine 10 per one period including the inertia running and the acceleration running, and obtains the running distance of the vehicle in the one period, based on the generated first corrected acceleration/deceleration running pattern. Then, the corrected acceleration/deceleration running pattern generating means obtains the first corrected acceleration/deceleration running pattern fuel consumption Mt1 based on the amount of fuel consumed and the running distance.

Also, the corrected acceleration/deceleration running pattern generating means generates the second corrected acceleration/deceleration running pattern (step ST9C).

At that time, the corrected acceleration/deceleration running pattern generating means obtains the difference between the actual acceleration/deceleration period T1 and the reference acceleration/deceleration period T0, and obtains the motor power of the second motor/generator 32 capable of elongating the running time of the inertia running relative to the actual acceleration/deceleration running pattern by the difference in time. In this case, the supplied electric power by the battery 41 sufficient for generating the motor power is also calculated. Then, the corrected acceleration/deceleration running pattern generating means generates the second corrected acceleration/deceleration running pattern shown in FIG. 7, for example, by using the target upper limit vehicle speed Vmax, the target lower limit vehicle speed Vmin and the running time of the acceleration running, which are the same as those of the actual acceleration/deceleration running pattern, and the running time of the inertia running elongated this time. That is to say, the second corrected acceleration/deceleration running pattern elongates the acceleration/deceleration period than in the actual acceleration/deceleration running pattern by elongating the running time of the inertia running. Therefore, when the actual acceleration/deceleration running pattern brings the uncomfortable feeling to the driver due to the short acceleration/deceleration period, the second corrected acceleration/deceleration running pattern can inhibit the uncomfortable feeling.

Herein, when generating, the deceleration of the vehicle before shifting from the inertia running to the acceleration running is gradually decreased, and the acceleration of the vehicle after shifting to the acceleration running is gradually increased so as to smoothly lead to the best acceleration $G_{best}$. Also, at that time, the acceleration of the vehicle before shifting from the acceleration running to the inertia running is gradually decreased from the best acceleration $G_{best}$, and the deceleration of the vehicle after shifting to the inertia running is gradually increased. By doing so, the drastic change in the acceleration and deceleration of the vehicle when switching between the inertia running and the acceleration running can be inhibited, and the uncomfortable feeling for the driver due to the drastic change in the acceleration and deceleration of the vehicle may be prevented.

The corrected acceleration/deceleration running pattern generating means calculates the second corrected acceleration/deceleration running pattern fuel consumption Mt2 after generating the second corrected acceleration/deceleration running pattern (step ST9D). At that time, the corrected acceleration/deceleration running pattern generating means obtains the amount of fuel consumed by the internal-combustion engine 10 per one period including the inertia running and the acceleration running, and obtains the fuel amount of the internal-combustion engine 10 required for recovering the supplied electric power to the second motor/generator 32 per one period, and further obtains the running distance of the vehicle in the one period, based on the generated second corrected acceleration/deceleration running pattern. Then, the main ECU 71 obtains the second corrected acceleration/deceleration running pattern fuel consumption Mt2 based on the amount of fuel consumed, the fuel amount, and the running distance.

Herein, the fuel amount of the internal-combustion engine 10 is obtained in a following manner. First, the corrected acceleration/deceleration running pattern generating means obtains the divided power capable of generating the electric power equivalent to the supplied electric power to the second motor/generator 32 per one period by the first motor/generator 31, and obtains the engine power of the internal-combustion engine 10 for transmitting the divided power to the first motor/generator 31. Then, the corrected acceleration/deceleration running pattern generating means obtains the fuel amount of the internal-combustion engine 10 required or outputting the engine power. The fuel amount is the fuel amount of the internal-combustion engine 10 required for recovering the supplied electric power to the second motor/generator 32 per one period.

Also, the corrected acceleration/deceleration running pattern generating means generates the third corrected acceleration/deceleration running pattern (step ST9E).

At that time, the corrected acceleration/deceleration running pattern generating means obtains the difference between the actual acceleration/deceleration period T1 and the reference acceleration/deceleration period T0, and adds the high-speed side constant vehicle speed running and the low-speed side constant vehicle speed running in the actual acceleration/deceleration period of the actual acceleration/deceleration running pattern by the difference in time. That is to say, the third corrected acceleration/deceleration running pattern herein generated elongates the acceleration/deceleration period than in the actual acceleration/deceleration running pattern by dividing the difference in time by the running time of the high-speed side constant vehicle speed running and the running time of the low-speed side constant vehicle speed running to compensate. Therefore, when the actual acceleration/deceleration running pattern brings the uncomfortable feeling to the driver due to the short acceleration/deceleration period, the third corrected acceleration/deceleration running pattern can inhibit the uncomfortable feeling.

Herein, it is set to divide such that the electric power of the battery 41 consumed by the low-speed side constant vehicle speed running and the electric power generated by the engine power of the internal-combustion engine 10 by the high-speed side constant vehicle speed running are equal as described above. When generating the third corrected acceleration/deceleration running pattern, the deceleration of the vehicle before shifting from the inertia running to the low-speed side constant vehicle speed running is gradually decreased, and the acceleration of the vehicle after shifting from the low-speed side constant vehicle speed running to the acceleration running is gradually increased to smoothly lead to the best acceleration $G_{best}$. Also, at that time, the acceleration of the vehicle before shifting from the acceleration running to the high-speed side constant vehicle speed running is gradually decreased from the best acceleration $G_{best}$, and the deceleration of the vehicle after shifting from the high-speed side constant vehicle speed running to the inertia running is gradually increased. By doing so, the drastic change in the acceleration and deceleration of the vehicle when switching between the inertia running and the acceleration running can be inhibited, and the uncomfortable feeling for the driver due to the drastic change in the acceleration and deceleration of the vehicle can be prevented. Especially, in the third corrected acceleration/deceleration running pattern, the constant vehicle speed running is interposed before and after the switching, so that the change in the acceleration and deceleration of the vehicle when switching becomes more smooth, and the uncomfortable feeling is much more solved than in the above-described first corrected acceleration/deceleration running pattern and the second corrected acceleration/deceleration running pattern.

The corrected acceleration/deceleration running pattern generating means calculates the third corrected acceleration/deceleration running pattern fuel consumption Mt3 after generating the third corrected acceleration/deceleration running pattern (step ST9F). At that time, the corrected acceleration/deceleration running pattern generating means obtains the amount of fuel consumed in the acceleration running of the internal-combustion engine 10 per one period including the inertia running and the acceleration running, and the fuel amount of the internal-combustion engine 10 required for recovering the supplied electric power to the second motor/generator 32 in the low-speed side constant vehicle speed running per one period or the amount of fuel consumed by the internal-combustion engine 10 in the high-speed side constant vehicle speed running per one period based on the generated third corrected acceleration/deceleration running pattern. Further, the corrected acceleration/deceleration running pattern generating means obtains the running distance of the vehicle in the one period. Then, the corrected acceleration/deceleration running pattern generating means obtains the third corrected acceleration/deceleration running pattern fuel consumption Mt3 based on the calculated values.

When the best acceleration/deceleration running pattern setting means of the main ECU 71 of the present embodiment generates the corrected acceleration/deceleration running patterns (the first corrected acceleration/deceleration running pattern, the second corrected acceleration/deceleration running pattern and the third corrected acceleration/deceleration running pattern) and calculates the fuel consumption (the first corrected acceleration/deceleration running pattern fuel consumption Mt1, the second corrected acceleration/deceleration running pattern fuel consumption Mt2 and the third corrected acceleration/deceleration running pattern fuel consumption Mt3) after the positive judgment at the above-described step ST8, this sets the one having the best numerical value out of the first corrected acceleration/deceleration running pattern fuel consumption Mt1, the second corrected acceleration/deceleration running pattern fuel consumption Mt2 and the third corrected acceleration/deceleration running pattern fuel consumption Mt3, as the best acceleration/deceleration running pattern fuel consumption $Mt_{best}$ (step ST10). In the present embodiment, the one having the large numerical value is more excellent in fuel consumption.

Then, the best acceleration/deceleration running pattern setting means sets the corrected acceleration/deceleration running pattern corresponding to the best acceleration/deceleration running pattern fuel consumption $Mt_{best}$ as the best acceleration/deceleration running pattern (step ST11). That is to say, when the first corrected acceleration/deceleration running pattern fuel consumption Mt1 is set as the best acceleration/deceleration running pattern fuel consumption $Mt_{best}$ at the above-described step ST10, this sets the first corrected acceleration/deceleration running pattern as the best acceleration/deceleration running pattern. Also, when the second corrected acceleration/deceleration running pattern fuel consumption Mt2 is set as the best acceleration/deceleration running pattern fuel consumption $Mt_{best}$ the second corrected acceleration/deceleration running pattern is set as the best acceleration/deceleration running pattern. Also, when the third corrected acceleration/deceleration running pattern fuel consumption Mt3 is set as the best acceleration/deceleration running pattern fuel consumption $Mt_{best}$, the third corrected acceleration/deceleration running pattern is set as the best acceleration/deceleration running pattern.

On the other hand, the constant vehicle speed running pattern generating means of the main ECU 71 obtains the constant vehicle speed $V_{const}$ {=(Vmax+Vmin)/2} of the constant vehicle speed running pattern based on the target upper limit vehicle speed Vmax and the target lower limit vehicle speed Vmin, for example (step ST12).

Then, the constant vehicle speed running pattern generating means calculates the constant vehicle speed running pattern fuel consumption $M_{const}$ (step ST13). When the running with the constant vehicle speed running pattern is performed only by the engine power of the internal-combustion engine 10, the constant vehicle speed running pattern generating means obtains the amount of fuel consumed by the internal-combustion engine 10 per predetermined time (for example, the reference acceleration/deceleration period T0) and obtains the running distance of the vehicle in the predetermined time. Then, the constant vehicle speed running pattern generating means obtains the constant vehicle speed running pattern fuel consumption $M_{const}$ based on the amount of fuel consumed and the running distance. Also, when the running with the constant vehicle speed running pattern is performed only by the motor power of the second motor/generator 32, the fuel amount of the internal-combustion engine 10 required for recovering the supplied electric power to the second motor/generator 32 per predetermined time is obtained, and the running distance of the vehicle in the predetermined time is obtained. Then, the constant vehicle speed running pattern generating means obtains the constant vehicle speed running pattern fuel consumption $M_{const}$ based on the fuel amount and the running distance. Also, when the running with the constant vehicle speed running pattern is performed by the engine power of the internal-combustion engine 10 and the motor power of the second motor/generator 32, the amount of fuel consumed by the internal-combustion engine 10 per predetermined time and the fuel amount of the internal-combustion engine 10 required for recovering the supplied electric power to the second motor/generator 32 per predetermined time are obtained, and the running distance of the vehicle in the predetermined time is further obtained. Then the constant vehicle speed running pattern generating means obtains the constant vehicle speed running pattern fuel consumption $M_{const}$ based on the amount of the fuel consumed, the fuel amount and the running distance.

The running pattern setting means of the main ECU 71 of the present embodiment compares the constant vehicle speed running pattern fuel consumption $M_{const}$ to the best acceleration/deceleration running pattern fuel consumption $Mt_{best}$ set at the above-described step ST10 in order to select the running pattern having the best fuel consumption (step ST14).

When it is judged that the numeric value of the best acceleration/deceleration running pattern fuel consumption $Mt_{best}$ is larger than that of the constant vehicle speed running pattern fuel consumption at the step ST14, the running pattern setting means sets the best acceleration/deceleration running pattern (that set at the above-described step ST11) as the running pattern after the accelerator off of this vehicle (step ST15). In this case, the acceleration/deceleration running controlling means of the main ECU 71 carries out the acceleration/deceleration running with that set at the step ST11 out of the actual acceleration/deceleration running pattern, the first corrected acceleration/deceleration running pattern, the second corrected acceleration/deceleration running pattern and the third corrected acceleration/deceleration running pattern.

On the other hand, when it is judged that the best acceleration/deceleration running pattern fuel consumption $Mt_{best}$ is not larger than the constant vehicle speed running pattern fuel consumption $M_{const}$ at the step ST14, the running pattern setting means sets the constant vehicle speed running pattern of which constant vehicle speed $V_{const}$ is determined at the step ST12 as the running pattern after the accelerator off of the vehicle (step ST16). In this case, the constant vehicle speed running controlling means of the main ECU 71 carries out the running with the constant vehicle speed running pattern when the vehicle speed is lowered to the constant vehicle speed of the constant vehicle speed running pattern by the inertia running after the accelerator off, for example.

In this manner, the vehicle running control apparatus and the vehicle running control method of the present embodiment puts the actual acceleration/deceleration running pattern as a candidate of the running pattern after the accelerator off in which the improvement of the fuel consumption and the resolution of the uncomfortable feeling of the driver can go together, if it is possible to solve the uncomfortable feeling for the driver due to the change in the vehicle speed and acceleration and deceleration of the vehicle (frequent switching between the inertia running and the acceleration running) while improving the fuel consumption by the actual acceleration/deceleration running pattern. Also, if it is not possible to that the improvement of the fuel consumption and the resolution of the uncomfortable feeling of the driver go together with the actual acceleration/deceleration running pattern, the vehicle running control apparatus and the vehicle running control method alters the actual acceleration/deceleration running pattern so as to achieve a good balance therebetween, and puts the one having the best fuel consumption out of the corrected acceleration/deceleration running patterns thus obtained (the first corrected acceleration/deceleration running pattern, the second corrected acceleration/deceleration running pattern and the third corrected acceleration/deceleration running pattern) as the candidate of the running pattern after the accelerator off. Therefore, the vehicle running control apparatus and the vehicle running control method of the present embodiment is capable of performing the acceleration/deceleration running with the acceleration/deceleration running pattern, which not only improves the fuel consumption but also solves the uncomfortable feeling for the driver due to the change in the vehicle speed and acceleration and deceleration of the vehicle.

Further, the vehicle running control apparatus and the vehicle running control method of the present embodiment also puts the constant vehicle speed running pattern, which may solve the uncomfortable feeling of the driver in the most effective way, as the candidate of the running pattern after the accelerator off, and compares the same to the above-described actual acceleration/deceleration running pattern or the corrected acceleration/deceleration running pattern, which are the candidates, in terms of the fuel consumption. Then, the vehicle running control apparatus and the vehicle running control method determines the one having the best fuel consumption as the final running pattern after the accelerator off. Therefore, when the actual acceleration/deceleration running pattern or the corrected acceleration/deceleration running pattern is more excellent in fuel consumption, the vehicle running control apparatus and the vehicle running control method of the present embodiment is capable of performing the acceleration/deceleration running in which the improvement of the fuel consumption and the resolution of the uncomfortable feeling for the driver due to the change in the vehicle speed and acceleration and deceleration of the vehicle, after the accelerator off. Also, when the constant vehicle speed running pattern is more excellent in fuel consumption, the vehicle running control apparatus and the vehicle running control method is capable of performing the running at the constant vehicle speed at which the driver substantially does not feel uncomfortable, while improving the fuel consumption after the accelerator off.

Further, the vehicle running control apparatus and the vehicle running control method of the present embodiment can select the running pattern after the accelerator off, which is suitable for improving the fuel consumption and solving the uncomfortable feeling of the driver, without depending on the motion of a vehicle in front (change in the vehicle speed) as in the above-described Patent Document 1. Therefore, the vehicle running control apparatus and the vehicle running control method can prevent a situation that the acceleration running and the inertia running are switched frequently depending on the motion of the vehicle in front, thereby increasing the change in the acceleration and deceleration of the vehicle. That is to say, the vehicle running control apparatus and the vehicle running control method of the present embodiment is capable of not only improving the fuel consumption but also solving the uncomfortable feeling of the driver, as compared to the above-described Patent Document 1.

Although the hybrid vehicle having the above-described configuration is illustrated as an object to which the vehicle running control apparatus and the vehicle running control method are applied in the present embodiment, the vehicle running control apparatus and the vehicle running control method can be applied to any vehicle as long as this is the vehicle enabling the acceleration/deceleration running, that is to say, the vehicle capable of breaking the connection between the output shaft of the thermal engine and the drive wheels during the running and stopping the operation of the thermal engine. For example, this may be the hybrid vehicle capable of stopping the thermal engine, which is the drive source, (stopping the supply of the fuel) during the running, and arranging the motor/generator as another drive source on the drive shaft or on the wheels.

Also, although different a little from such vehicle, in a case of the thermal engine of which amount of fuel consumed in an idling state is small, it is possible to carry out only by blocking the transmission of the drive force of the thermal engine to the drive wheels W, W without stopping the thermal engine during the inertia running. Specifically, the vehicle running control apparatus and the vehicle running control method of the present embodiment may be applied to the vehicle capable of controlling an automatic transmission to a neutral state during the running (for example, vehicle disclosed in the Japanese Laid-Open Patent Application Publication No. 2005-36824). In this case, this may be the vehicle provided with the motor/generator as the drive source, or the vehicle without the motor/generator. When the motor/generator is not provided, the above-described second corrected acceleration/deceleration running pattern is excluded from the object of the corrected acceleration/deceleration running pattern, and the third corrected acceleration/deceleration pattern carries out the constant vehicle speed running only by the drive force of the internal-combustion engine 10.

Industrial Applicability

As described above, the vehicle running control apparatus and the vehicle running control method according to the present invention can be applied to the vehicle capable of carrying out the acceleration/deceleration running pattern, which alternately repeats the acceleration running for accelerating until reaching the target upper limit vehicle speed by utilizing the drive force of the thermal engine after reaching the target lower limit vehicle speed, and the inertia running for blocking the transmission of the drive force of the thermal engine to the drive wheels after reaching the target upper limit vehicle speed and allowing the vehicle to run through inertia until reaching the target lower limit vehicle speed after the accelerator off, and is useful as the technique in which the improvement of the fuel consumption and the resolution of the uncomfortable feeling for the driver associated with the change in the vehicle speed and acceleration and deceleration of the vehicle can go together with the running pattern after the accelerator off.

The invention claimed is:

1. A vehicle running control apparatus for carrying out an acceleration/deceleration running pattern alternately repeating acceleration running for accelerating a vehicle running with at least a thermal engine as a drive source until reaching a target upper limit vehicle speed by utilizing drive force of the drive source after reaching a target lower limit vehicle speed, and inertia running for blocking transmission of the drive force of the thermal engine to drive wheels after reaching the target upper limit vehicle speed and allowing the vehicle to run through inertia until reaching the target lower limit vehicle speed, the apparatus comprising:

an actual acceleration/deceleration running pattern generating unit that generates an actual acceleration/deceleration running pattern including actual running states of the inertia running and the acceleration running based on a current running situation of the vehicle;

a corrected acceleration/deceleration running pattern generating unit that generates a corrected acceleration/deceleration running pattern obtained by elongating an actual acceleration/deceleration period of the actual acceleration/deceleration running pattern, when the actual acceleration/deceleration period from start of the inertia running to end of the acceleration running in the actual acceleration/deceleration running pattern is shorter than a reference acceleration/deceleration period set in advance; and an acceleration/deceleration running pattern setting unit that sets the actual acceleration/deceleration running pattern as a set acceleration/deceleration running pattern when the corrected acceleration/deceleration running pattern is not generated, and that sets the corrected acceleration/deceleration running pattern as the set acceleration/deceleration running pattern when the corrected acceleration/deceleration running pattern is generated.

2. The vehicle running control apparatus according to claim 1, wherein acceleration at the time of the acceleration running in the actual acceleration/deceleration running pattern is corrected to be small when generating the corrected acceleration/deceleration running pattern obtained by elongating the actual acceleration/deceleration period.

3. The vehicle running control apparatus according to claim 1, wherein acceleration at the time of the acceleration running in the actual acceleration/deceleration running pattern is corrected to be small when generating the corrected acceleration/deceleration running pattern obtained by elongating the actual acceleration/deceleration period, and when the acceleration is corrected, a target charge amount of a storage battery for storing electric power generated by utilizing a part of the power of the thermal engine is reset to a large value corresponding to the acceleration after correction.

4. The vehicle running control apparatus according to claim 1, wherein, when the vehicle is provided with a motor in addition to the thermal engine as the drive source, deceleration at the time of the inertia running in the actual acceleration/deceleration running pattern is corrected to be small by adding drive force of the motor when generating the corrected acceleration/deceleration running pattern obtained by elongating the actual acceleration/deceleration period.

5. The vehicle running control apparatus according to claim 1, wherein, when generating the corrected acceleration/deceleration running pattern obtained by elongating the actual acceleration/deceleration period, constant vehicle speed running at the target lower limit vehicle speed is added when shifting from the inertia running to the acceleration running of the actual acceleration/deceleration running pattern, and/or constant vehicle speed running at the target upper limit vehicle speed is added when shifting from the acceleration running to the inertia running of the actual acceleration/deceleration running pattern.

6. The vehicle running control apparatus according to claim 1, wherein, when generating the corrected acceleration/deceleration running pattern obtained by elongating the actual acceleration/deceleration period, constant vehicle speed running at the target lower limit vehicle speed carried out by activating a motor is added if the vehicle is provided with the motor in addition to the thermal engine as the drive source when shifting from the inertia running to the acceleration running of the actual acceleration/deceleration running pattern, and/or constant vehicle speed running at the target upper limit vehicle speed carried out by activating the thermal engine is added when shifting from the acceleration running to the inertia running of the actual acceleration/deceleration running pattern.

7. The vehicle running control apparatus according to claim 1, wherein, when generating the actual acceleration/deceleration running pattern, acceleration at the time of the acceleration running of the actual acceleration/deceleration running pattern excellent in thermal efficiency of the thermal engine is obtained based on a road grade of a road on which the vehicle is running and a vehicle speed, which are running situations of the vehicle.

8. The vehicle running control apparatus according to claim 1, wherein the target upper limit vehicle speed is set according to requirement of a driver.

9. The vehicle running control apparatus according to claim 1, wherein, when setting the target upper limit vehicle speed, a vehicle speed at the time of accelerator off associated with accelerator pedal operation by a driver is set as the target upper limit vehicle speed.

10. The vehicle running control apparatus according to claim 1, wherein the target lower limit vehicle speed is set based on the target upper limit vehicle speed and a road grade of a road on which the vehicle is running, which are running situations of the vehicle.

11. The vehicle running control apparatus according to claim 1, wherein the target lower limit vehicle speed is set such that difference in vehicle speed between the target lower limit vehicle speed and the target upper vehicle speed gets smaller with increasing target upper limit vehicle speed, when a road grade of a road on which the vehicle is running is up-grade.

12. The vehicle running control apparatus according to claim 1, wherein the target lower limit vehicle speed is set such that difference in vehicle speed between the target lower limit vehicle speed and the target upper vehicle speed gets larger with increasing target upper limit vehicle speed, when a road grade of a road on which the vehicle is running is down-grade.

13. The vehicle running control apparatus according to claim 1, wherein the reference acceleration/deceleration period is a value, which can be changed by a driver according to preference, or a value set in advance such that improvement of fuel consumption and resolution of uncomfortable feeling of the driver associated with change in vehicle speed and acceleration and deceleration of the vehicle can go together.

14. The vehicle running control apparatus according to claim 1, wherein the inertia running is carried out by blocking the transmission of the drive force of the thermal engine to the drive wheels and by stopping the thermal engine, or carried out only by blocking the transmission of the drive force of the thermal engine to the drive wheels without stopping the thermal engine when an amount of fuel consumed in an idling state of the thermal engine is small.

15. A vehicle running control method for carrying out an acceleration/deceleration running pattern alternately repeating acceleration running for accelerating a vehicle running with at least a thermal engine as a drive source until reaching a target upper limit vehicle speed by utilizing drive force of the drive source after reaching a target lower limit vehicle speed, and inertia running for blocking transmission of the drive force of the thermal engine to drive wheels after reaching the target upper limit vehicle speed and allowing the vehicle to run through inertia until reaching the target lower limit vehicle speed, the method comprising:

generating an actual acceleration/deceleration running pattern including actual running states of the inertia running and the acceleration running based on a current running situation of the vehicle;

generating a corrected acceleration/deceleration running pattern obtained by elongating an actual acceleration/deceleration period of the actual acceleration/deceleration running pattern, when the actual acceleration/deceleration period from start of the inertia running to end of the acceleration running in the actual acceleration/deceleration running pattern is shorter than a reference acceleration/deceleration period set in advance; and setting the actual acceleration/deceleration running pattern as a set acceleration/deceleration running pattern when the corrected acceleration/deceleration running pattern is not generated, and setting the corrected acceleration/deceleration running pattern as the set acceleration/deceleration running pattern when the corrected acceleration/deceleration running pattern is generated.

16. The vehicle running control method according to claim 15, wherein acceleration at the time of the acceleration running in the actual acceleration/deceleration running pattern is corrected to be small when generating the corrected acceleration/deceleration running pattern obtained by elongating the actual acceleration/deceleration period.

17. The vehicle running control method according to claim 15, wherein acceleration at the time of the acceleration running in the actual acceleration/deceleration running pattern is corrected to be small when generating the corrected acceleration/deceleration running pattern obtained by elongating the actual acceleration/deceleration period, and when the acceleration is corrected, a target charge amount of a storage battery for storing electric power generated by utilizing a part of the power of the thermal engine is reset to a large value corresponding to the acceleration after correction.

18. The vehicle running control method according to claim 15, wherein, when the vehicle is provided with a motor in addition to the thermal engine as the drive source, deceleration at the time of the inertia running in the actual acceleration/deceleration running pattern is corrected to be small by adding drive force of the motor when generating the corrected acceleration/deceleration running pattern obtained by elongating the actual acceleration/deceleration period.

19. The vehicle running control method according to claim 15, wherein, when generating the corrected acceleration/deceleration running pattern obtained by elongating the actual acceleration/deceleration period, constant vehicle speed running at the target lower limit vehicle speed is added when shifting from the inertia running to the acceleration running of the actual acceleration/deceleration running pattern, and/or constant vehicle speed running at the target upper limit vehicle speed is added when shifting from the acceleration running to the inertia running of the actual acceleration/deceleration running pattern.

20. The vehicle running control method according to claim 15, wherein, when generating the corrected acceleration/deceleration running pattern obtained by elongating the actual acceleration/deceleration period, constant vehicle speed running at the target lower limit vehicle speed carried out by activating a motor is added if the vehicle is provided with the motor in addition to the thermal engine as the drive source when shifting from the inertia running to the acceleration running of the actual acceleration/deceleration running pattern, and/or constant vehicle speed running at the target upper limit vehicle speed carried out by activating the thermal engine is added when shifting from the acceleration running to the inertia running of the actual acceleration/deceleration running pattern.

21. The vehicle running control method according to claim 15, wherein, when generating the actual acceleration/deceleration running pattern, acceleration at the time of the acceleration running of the actual acceleration/deceleration running pattern excellent in thermal efficiency of the thermal engine is obtained based on a road grade of a road on which the vehicle is running and a vehicle speed, which are running situations of the vehicle.

22. The vehicle running control method according to claim 15, wherein the target upper limit vehicle speed is set according to requirement of a driver.

23. The vehicle running control method according to claim 15, wherein, when setting the target upper limit vehicle speed, a vehicle speed at the time of accelerator off associated with accelerator pedal operation by a driver is set as the target upper limit vehicle speed.

24. The vehicle running control method according to claim 15, wherein the target lower limit vehicle speed is set based on the target upper limit vehicle speed and a road grade of a road on which the vehicle is running, which are running situations of the vehicle.

25. The vehicle running control method according to claim 15, wherein the target lower limit vehicle speed is set such that difference in vehicle speed between the target lower limit vehicle speed and the target upper vehicle speed gets smaller with increasing target upper limit vehicle speed, when a road grade of a road on which the vehicle is running is up-grade.

26. The vehicle running control method according to claim 15, wherein the target lower limit vehicle speed is set such that difference in vehicle speed between the target lower limit vehicle speed and the target upper vehicle speed gets larger with increasing target upper limit vehicle speed, when a road grade of a road on which the vehicle is running is down-grade.

27. The vehicle running control method according to claim 15, wherein the reference acceleration/deceleration period is a value, which can be changed by a driver according to preference, or a value set in advance such that improvement of fuel consumption and resolution of uncomfortable feeling of the driver associated with change in vehicle speed and acceleration and deceleration of the vehicle can go together.

28. The vehicle running control method according to claim 15, wherein the inertia running is carried out by blocking the transmission of the drive force of the thermal engine to the drive wheels and by stopping the thermal engine, or carried out only by blocking the transmission of the drive force of the thermal engine to the drive wheels without stopping the thermal engine when an amount of fuel consumed in an idling state of the thermal engine is small.

\* \* \* \* \*